United States Patent [19]
Aihara et al.

[11] Patent Number: 6,011,634
[45] Date of Patent: *Jan. 4, 2000

[54] PORTABLE FACSIMILE EQUIPMENT

[75] Inventors: Masayoshi Aihara; Toshiyuki Yokochi; Akira Nakano; Masaru Yamamura, all of Hachioji, Japan; Yasuaki Hashimoto, Kelawei, Malaysia; Hiroshi Hashizume, Hino, Japan; Hiroshi Miyauchi, Irvine, Calif.

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/861,752

[22] Filed: May 22, 1997

Related U.S. Application Data

[63] Continuation of application No. 08/662,267, Jun. 7, 1996, abandoned, which is a continuation of application No. 08/455,131, May 31, 1995, abandoned, which is a continuation of application No. 08/158,500, Nov. 29, 1993, abandoned.

[30] Foreign Application Priority Data

Nov. 27, 1992 [JP] Japan ................................. 4-318792
Nov. 27, 1992 [JP] Japan ................................. 4-318793
Nov. 27, 1992 [JP] Japan ................................. 4-318794
Nov. 27, 1992 [JP] Japan ................................. 4-318795

[51] Int. Cl.$^7$ ...................................................... H04N 1/32
[52] U.S. Cl. ........................................... 358/468; 358/442
[58] Field of Search ................................... 358/400, 434, 358/435, 436, 437, 438, 439, 440, 443, 447, 468, 431, 442; 379/25, 30, 100.01

[56] References Cited

U.S. PATENT DOCUMENTS

| 3,983,338 | 9/1976 | Mathauser | 379/30 |
| 4,124,871 | 11/1978 | Morrin, II | 358/444 |
| 4,571,456 | 2/1986 | Paulsen | 179/2 |
| 4,860,110 | 8/1989 | Kokubu | 358/400 |
| 4,887,162 | 12/1989 | Arai | 358/400 |
| 4,893,187 | 1/1990 | Tsujimoto | 358/261.1 |
| 4,974,098 | 11/1990 | Kaneko et al. | 358/400 |
| 5,394,406 | 2/1995 | Ono et al. | 358/400 |
| 5,404,434 | 4/1995 | Otsuka | 395/145 |
| 5,668,640 | 9/1997 | Nozawa et al. | 379/100.01 |

FOREIGN PATENT DOCUMENTS

| 0411698 | 2/1989 | European Pat. Off. . |
| 0411698 | 2/1991 | European Pat. Off. . |
| 64-54866 | 3/1989 | Japan . |
| 01202932 | 8/1989 | Japan . |
| 02154565 | 6/1990 | Japan . |
| 2-233055 | 9/1990 | Japan ................................. H04N 1/00 |
| 9008431 | 7/1990 | WIPO . |

OTHER PUBLICATIONS

Bit Fax User Manual Publish By Bit Fax Copyright Feb. 1992.
Bit Fax For Windows (User Manual) Copyright Feb. 1992 By Bit Software, Inc.

*Primary Examiner*—Kimberly A. Williams
*Attorney, Agent, or Firm*—Finnegan, Henderson, Farabow, Garrett & Dunner, L.L.P.

[57] ABSTRACT

A portable facsimile equipment in which document data to be transmitted can be displayed on an LCD display. When it is desired for a communication module to transmit document data obtained through a document module or a scanner module, the document data to be transmitted can be displayed on the LCD display. When it is desired to display image data read out by a scanner and stored in a RAM on the LCD display; the image data having a resolution of 8 lines/mm read out by the scanner and stored in the RAM is converted to data having a resolution of 3 lines/mm for display thereof on the LCD display. Further, the communication module performs its communication with a wired line through a modular connector provided at a side of an LCD board, and the received information is displayed on the LCD display. The LCD display is provided to the LCD board which covers the portable facsimile equipment body having a keyboard mounted thereon, and the information read out by the scanner for reading of information of an original document is displayed on the LCD display.

24 Claims, 19 Drawing Sheets

| | Wn | Co | Id | Ad | Pa |
|---|---|---|---|---|---|
| | DOCUMENT NAME | TYPE CODE | ID CODE | HEADER ADDRESS | PAGE NO. |
| e1 | A A A | 0 0 | x x x x | 0 0 0 0 | 5 |
| ⋮ | ⋮ | ⋮ | ⋮ | ⋮ | ⋮ |
| en-1 | C C C | 1 0 | 0 0 0 0 | 1 0 0 0 | 4 |
| en | C C C | 1 1 | 0 0 0 0 | 1 1 0 0 | 2 | e

PORTABLE FACSIMILE EQUIPMENT

This application is a continuation, of application Ser. No. 08/662,267, filed Jun. 7, 1996, now abandoned, which is a continuation application of Ser. No. 08/455,131, filed May 31, 1995, now abandoned; which is a continuation of application Ser. No. 08/158,500, filed Nov. 29, 1993, now abandoned.

BACKGROUND OF THE INVENTION

1. Field of the Invention

The present invention relates to portable facsimile equipments which allow duplex communication of data read out from original documents through a line and more particularly, to a portable facsimile equipment which has functions more than the functions of a fixed facsimile equipment.

2. Description of the Related Art

In these years, there have been widely spread facsimile equipments which allow duplex communication of data read out from original documents through a line.

As well known, such conventional facsimile equipments comprise a reader for reading out data from an original document, a transmitter for transmitting the read-out document data through a wired line to a destination party at the other end of the line, a receiver for receiving data received from the destination party through the wire line, and a recorder (thermal recorder) for printing the received data on paper or the like by means of heat transfer or the like.

Most of such facsimile equipments are generally of an installation type which are difficult to move to another place once they are installed at one place.

Further, since this type of conventional facsimile equipments must be connected to the wired line, their installation place is limited to the vicinity of the line output terminal.

In addition, such a conventional facsimile equipment, even if it is of a small size type, has such basic constituent elements as a recorder and a reader, which results in that the facsimile equipment still has a size and a weight unsuitable as a portable one.

These years, there have been widely spread carrying type electronic equipments which include Japanese word processors and personal computers, and these equipments have been made smaller in size and weight to such an extent that they can be called so-called book size.

One of portable facsimile equipments put presently in practical use is a so-called attache case type (carrying case type) facsimile equipment which attache case incorporates the aforementioned constituent elements of the conventional facsimile equipment. This portable facsimile equipment is placed on a desk in an office or the like, connected to a modular jack connected to a telephone set or acoustically connected to a handset of the telephone set through an acoustic coupler to realize facsimile transmission/reception through wired line.

However, even such a portable type of facsimile equipment has a disadvantage that, since the facsimile equipment must be connected to the wired line to attain its facsimile transmission/reception, this inevitably limits its application place and thus the facsimile equipment cannot be used in such a place having no wired line as, for example, in a car.

Further, since such a portable type of facsimile equipment also has a thermal recorder for printing (recording) data on recording paper, the necessity of the recording paper, the recording head, drive circuit, etc. in the recorder inevitably places some restrictions on realization of a small-size, light-weight portable facsimile equipment. In addition, a high power supply capacity is required to drive the recorder, which hinders miniaturization of a power supply. It is impossible for a battery to drive the recorder, which is highly inconvenient.

Furthermore, since the portable facsimile equipment cannot select the received image data and merely can record it, unnecessary part of the image data is also inconveniently recorded.

Also, the image data reader is fixedly mounted to the body of the facsimile equipment, which leads to the fact that the facsimile equipment cannot read data of such as non-definite form document as newspaper or book and can read data of only a single page of document sheet having a predetermined size (such as A4, B4 or B5). For this reason, editing of image data to be transmitted, for example, selective assignment of a necessary part thereof cannot be attained, and thus all the image data of a sheet of an original document inserted into a document insert slot must be inevitably transmitted. Thus, when it is desired to transmit only necessary part of the image data of the document to be transmitted, the sender inconveniently must first copy the original, cut off a necessary part from the copied sheet with use of scissors, paste it on a predetermined size of paper sheet to create a new document for transmission, and then insert the new document into the original insert slot for its transmission; or the sender inconveniently must cut the part and insert it into the original insert slot for its transmission.

SUMMARY OF THE INVENTION

It is an object of the present invention to provide a portable facsimile equipment which can solve the above problems and have functions more than functions of a fixed type facsimile equipment.

In accordance with an aspect of the present invention, the above object is attained by providing a portable facsimile equipment which comprises input means for inputting information to be transmitted; memory means for storing therein the information entered from the input means; transmission means for reading out the information stored in the memory means and transmitting the information as a facsimile signal to a destination party; display means; and control means for causing the information to be displayed on the display means in synchronism with transmission of the information.

In accordance with another aspect of the present invention, there is provided a portable facsimile equipment which comprises input means for inputting information to be transmitted; memory means for storing therein the information entered through the input means on a predetermined information-unit basis and also storing therein page data of the information; transmission means, when a plurality of predetermined information-units of the information stored in the memory means are specified to be transmitted, for continuously reading out the specified information therefrom and transmitting the specified information as a facsimile signal to a destination party; display means; counter means for adding together page data of all predetermined information-units of the information to be transmitted from the transmission means and for counting a current transmission page; and control means for causing the display means to display the page data in synchronism with transmission of total page data obtained through addition of the page data, the transmission page data and the information.

In accordance with a further aspect of the present invention, there is provided a portable facsimile equipment which comprises input means for inputting information to be transmitted; memory means for storing therein the information inputted through the input means; transmission means for reading out the information stored in the memory means and transmitting the information as a facsimile signal to a destination party; detection means for detecting a trouble in a transmission state of the transmission means; re-transmission means, when the detection means detect a trouble, for again reading out the information from the memory means and re-transmitting the information; and attachment means for attaching a predetermined message to the information read out from the memory means during re-transmission.

In accordance with yet another aspect of the present invention, there is provided a portable facsimile equipment which comprises input means for inputting information to be transmitted; memory means for storing therein the information inputted through the input means; transmission means for reading out the information stored in the memory means and transmitting the information as a facsimile signal to a destination party on a predetermined information-unit basis; and dummy information attachment means, when the information to be transmitted is less than the predetermined information-unit, for attaching dummy information to the transmission information so that information becomes the predetermined information-unit.

In accordance with aspect of the present invention, there is provided a portable facsimile equipment which comprises reading means for reading information to be transmitted; memory means for storing therein the information read by the reading means; transmission/reception means for reading out the information stored in the memory means, transmitting the read information as a facsimile signal to a destination party, and receiving information transmitted from a communication party; operating means; document preparation means for preparing a document on the basis of operation of the operating means; display means for displaying thereon the information stored in the memory means and the document prepared by the document preparation means; lid means pivotally mounted to a portable facsimile equipment body and having the display means mounted thereon; power supply means; a power switch provided at a part of the equipment body covered with the lid means when the lid means is closed; detection means for detecting an open or closed state of the lid means; and control means for causing the power supply means to supply power to the transmission/reception means, the document preparation means and the display means when the power switch is turned ON and when the detection means detects the open state of the lid means, while, for causing the power supply means to inhibit its power supply to the transmission/reception means, the document preparation means and the display means when the power switch is turned ON and when the detection means detects the closed state of the lid means.

In accordance with yet a further aspect of the present invention, there is provided a portable facsimile equipment which comprises reading means for reading information to be transmitted; memory means for storing therein the information read by the reading means; transmission/reception means for reading out the information stored in the memory means, transmitting the read information as a facsimile signal to a destination party, and receiving information transmitted from the destination party; a transmission/reception switch for starting operation of the transmission/reception means; operating means; document preparation means for preparing a document on the basis of operation of the operating means; display means for displaying thereon the information stored in the memory means and the document prepared by the document preparation means; lid means pivotally mounted to a portable facsimile equipment body and having the display means mounted thereon; power supply means; a power switch provided at a part of the equipment body covered with the lid means when the lid means is closed; detection means for detecting an open or closed state of the lid means; control means for causing the power supply means to supply power to the transmission/reception means, the document preparation means and the display means when the power switch is turned ON and when the detection means detects the open state of the lid means, while, for causing the power supply means to inhibit its power supply to the transmission/reception means, the document preparation means and the display means when the power switch is turned ON and when the detection means detects the closed state of the lid means; and operating data control means, when the power switch is turned ON and when the detection means detects the closed state of the lid means, for invalidating operating data of the transmission/reception switch.

In accordance with another aspect of the present invention, there is provided a portable facsimile equipment which comprises input means for inputting information to be transmitted; recording means having a memory area divided according to an order of a series of consecutive addresses; transmission means for reading out the information stored in the recording means and transmitting the read information as a facsimile signal to a destination party; and control means for causing the information inputted through the input means to be stored in the recording means sequentially from a minimum or maximum address area and also for causing management information associated with the information to be stored in the recording means sequentially form the maximum or minimum address area.

In accordance with another aspect of the present invention, there is provided a portable facsimile equipment which comprises reading means for reading out information of an original document with a first resolution; memory means for storing therein the information read out by the reading means; transmission/reception means for transmitting and receiving information; display means for displaying thereon the information with a second resolution; and conversion means, when it is desired to display the information read out by the reading means and stored in the memory means on the display means, for converting the information of the first resolution read out by the reading means and stored in the memory means into the information of the second resolution.

In accordance with another aspect of the present invention, there is provided a portable facsimile equipment which comprises reading means for reading out information of an original document; memory means for storing therein the information read out by the reading means; transmission/reception means for transmitting and receiving information; display means for displaying thereon information; and control means, when receiving instruction for scroll display, for scrollingly displaying the information on the display means on a predetermined information-unit basis.

In accordance with another aspect of the present invention, there is provided a portable facsimile equipment which comprises reading means for reading out information of an original document with a first resolution; memory means for storing therein the information read out by the reading means; transmission/reception means for transmitting and receiving information; display means for displaying thereon the information with a second resolution; and control means for converting the resolution of the information stored in the memory means to be displayed on the display means on a predetermined-unit basis.

In accordance with another aspect of the present invention, there is provided a portable facsimile equipment which comprises reading means for reading out information of an original document; memory means for managingly storing therein the information read out by the reading means on a predetermined-information-unit basis; transmission/reception means for transmitting and receiving information; display means for displaying thereon information on the predetermined information-unit basis; displaying memory means having at least a memory area for the predetermined information-unit and an integer multiple of the memory area for the predetermined information-unit, for storing therein information to be displayed on the display means; and control means, when receiving instruction for scroll display, for causing the information to be scrollingly displayed on the display means.

In accordance with another aspect of the present invention, there is provided a portable facsimile equipment which comprises input means for inputting information; memory means for storing therein the information inputted through the input means on a predetermined information-unit basis and also storing page information associated with the information; transmission means, when a plurality of predetermined information units of the stored information are specified to be transmitted, for continuously reading out the information from the memory means and transmitting the read information as a facsimile signal; display means; detection means for detecting an electric field intensity; and control means for causing the display means to display a level of the field intensity on the basis of information indicative of the electric field intensity detected by the detection means.

In accordance with another aspect of the present invention, there is provided a portable facsimile equipment which comprises radio circuit means for performing connection with a spatial radio circuit link; wired circuit means connected to a wired line; detection means for detecting the fact that the wired line is connected to the wired circuit means; and selection means for selecting the wired circuit means when the detection means detects the fact that the wired line is connected to the wired circuit means, while for selecting the radio circuit means when the detection means fails to detect that the wired line is connected to the wired circuit means.

In accordance with another aspect of the present invention, there is provided a portable facsimile equipment which comprises input means for inputting information; memory means for storing therein the information entered through the input means; output means for reading out the information stored in the memory means and outputting the read information as a facsimile signal; and pixel density conversion means for converting the facsimile signal into data having a pixel density matching with an external device and outputting the converted signal.

In accordance with another aspect of the present invention, there is provided a portable facsimile equipment which comprises document preparation means; a keyboard; first memory means for storing therein code data of re-preparation document prepared by the document preparation means; display means; reception means for receiving and demodulating information; second memory means for storing therein information; and control means, when an information reception request is detected during document preparation of the document preparation means, for causing the display means to display thereon the information reception request and setting an information path between the reception means and the second memory means so as to separate from a system associated with the document preparation.

In accordance with another aspect of the present invention, there is provided a portable facsimile equipment which comprises an equipment body having a plurality of keys mounted on an upper surface thereof; lid means pivotally mounted to the equipment body to cover the plurality of keys of the equipment body; a connector for wired line connection provided at a side of the lid means; communication circuit means provided in the lid means for performing communication with a wired line through the connector; and display means provided on an inside surface of the lid means for displaying thereon information received at the communication circuit means.

In accordance with another aspect of the present invention, there is provided a portable facsimile equipment which comprises an equipment body having a plurality of keys mounted on an upper surface thereof; lid means pivotally mounted to the equipment body to cover the plurality of keys of the equipment body; radio means for performing communication of information through an antenna and a spatial radio circuit link; speech circuit means; speech headset accommodation means covered with the lid means and provided in an upper side of the equipment body not overlapped with a location of the plurality of keys; a speech headset accommodatable in the speech headset accommodation means; and display means provided on an inside surface of the lid means for displaying thereon information received at the radio means, wherein the antenna, the radio means and the speech circuit means are provided within the lid means, and wherein a connector for connection between the speech headset and the speech circuit means is provided on a side of the lid means.

In accordance with another aspect of the present invention, there is provided a portable facsimile equipment which comprises an equipment body having a plurality of keys mounted on an upper surface thereof; lid means pivotally mounted to the equipment body to cover the plurality of keys of the equipment body; radio means for performing communication of information through an antenna and a spatial radio circuit link; speech circuit means; a speech handset; and display means provided on an inside surface of the lid means for displaying thereon information received at the radio means, wherein the antenna and the radio means and the speech circuit means are provided within the lid means, and wherein a connector for connection between the speech handset and the speech circuit means is provided on a side of the lid means.

In accordance with another aspect of the present invention, there is provided a portable facsimile equipment which comprises an equipment body having a plurality of keys mounted thereon; lid means pivotally mounted to the equipment body to cover the plurality of keys of the equipment body; radio means for performing communication of information through an antenna and a spatial radio circuit link; and display means provided on an inside surface of the lid means for displaying thereon information received at the radio means, wherein the antenna and the radio means are provided within the lid means.

In accordance with another aspect of the present invention, there is provided a portable facsimile equipment which comprises an equipment body having a plurality of keys mounted on an upper surface thereof; lid means pivotally mounted to the equipment body to cover the plurality of keys of the equipment body; reading means for reading out information of an original document; and display means provided on an inside surface of the lid means for displaying thereon the information read out by the reading means.

In accordance with another aspect of the present invention, there is provided a portable facsimile equipment which comprises an equipment body having a plurality of keys mounted on an upper surface thereof; lid means for covering the plurality of keys of the equipment body, the lid means being pivoted by means of rotary arms provided extendingly along both sides of the equipment body; document insert means provided in the equipment body at a position between the rotary arms of the lid means so as to be opened or closed in response to opening or closing of the lid means; a guide member provided in the document insert means for guiding an original document; reading means provided to the equipment body at a position not covered with the lid means for reading out information of the document guided by the guide member; and display means provided on an inside surface of the lid means for displaying thereon the information read out by the reading means.

In accordance with another aspect of the present invention, there is provided a portable facsimile equipment which comprises an equipment body having a plurality of keys mounted on an upper surface thereof; lid means for covering the plurality of keys of the equipment body, the lid means being pivoted by means of rotary arms provided extendingly along both sides of the equipment body; document insert means provided in the equipment body at a position between the rotary arms of the lid means so as to be opened or closed in response to opening or closing of the lid means; covering means provided at an upper surface edge of the lid means between the rotary arms for covering a gap defined between the equipment body and the lid means by a resilient force when the lid means is closed; a guide member provided in the document insert means for guiding an original document; reading means provided to the equipment body at a position not covered with the lid means for reading out information of the document guided by the guide member; and display means provided on an inside surface of the lid means for displaying thereon the information read out by the reading means.

In accordance with another aspect of the present invention, there is provided a portable facsimile equipment which comprises an equipment body having a plurality of keys mounted on an upper surface thereof; lid means for covering the plurality of keys of the equipment body, the lid means being pivoted by means of rotary arms provided extendingly along both sides of the equipment body; document insert means provided in the equipment body at a position between the rotary arms of the lid means so as to be opened or closed in response to opening or closing of the lid means; a guide member being moved along a longitudinal direction of an insert slot of the document insert means to match a width of an inserted document and thereby to thereby prevent a lateral shift of the document being fed; reading means provided to the equipment body at a position not covered with the lid means for reading out information of the document guided by the guide member; and display means provided on an inside surface of the lid means for displaying thereon the information read out by the reading means.

In accordance with another aspect of the present invention, there is provided a portable facsimile equipment which comprises an equipment body having a plurality of keys mounted on an upper surface thereof; lid means, when pivoted, for covering the plurality of keys of the equipment body; reading means mounted to the equipment body for reading information of an original document; a feeding roller provided within the equipment body at a position corresponding to a mounted position of the reading means as contacted with a reading surface of the reading means; a hand roller being cooperatively connected with the feeding roller and, when rotated, for rotating the feeding roller to thereby feed the document to the reading means; and display means provided on an inside surface of the lid means for displaying thereon the information read out by the reading means.

In accordance with another aspect of the present invention, there is provided a portable facsimile equipment which comprises an equipment body having a plurality of keys mounted on an upper surface thereof; lid means, when pivoted, for covering the plurality of keys of the equipment body; reading means detachably held to an upper surface edge of the equipment body at a position not covered with the lid means for reading out information of an original document; covering means for covering a document discharging gap defined in a rear edge of the equipment body between the reading means and the equipment body when the reading means is mounted to the equipment body; and display means provided in an inside surface of the lid means for displaying thereon the information read out by the reading means.

In accordance with another aspect of the present invention, there is provided a portable facsimile equipment which comprises an equipment body having a plurality of keys mounted on an upper surface thereof; lid means, when pivoted, for covering the plurality of keys of the equipment body; reading means detachably held to an upper surface edge of the equipment body at a position not covered with the lid means for reading out information of an original document; a feeding roller provided within the equipment body at a position corresponding to a mounted position of the reading means as contacted with a reading surface of the reading means; movement detection means positioned as contacted with the feeding roller when the reading means is mounted to the equipment body for supplying detected movement information to the reading means; and display means provided on an inside surface of the lid means for displaying thereon the information read out by the reading means.

According to the present invention, when the information stored in the memory means is read out and transmitted a destination party as a facsimile signal, since the information being transmitted is displayed on the display means in synchronism with the transmission of the information, a user can confirm the information being transmitted and the handleability of the portable facsimile equipment can be improved.

According to the present invention, when a plurality of predetermined information-units of information stored in the memory means are specified to be transmitted, the specified information-units of the information are continuously read out and transmitted to a destination party as a facsimile signal, the page data of all the information-units of the information are added together to count the current transmission page, and the total page data obtained by adding together the page data is displayed on the display means in synchronism with the transmission of the page data and the information. As a result, the user can see the transmission state of the information and the handleability of the portable facsimile equipment can be improved.

According to the present invention, when the information stored in the memory means is read out and transmitted to the destination party as the facsimile signal, if the detection means detect a trouble in the transmission state, then the information is again read out from the memory means and again transmitted, and the predetermined message is attached to the information read out from the memory means during re-transmission. As a result, the portable facsimile equipment can reliably transmit the information to the destination party and also can inform the destination party of the fact that there was a trouble during transmission.

According to the present invention, when the information stored in the memory means is read out and transmitted as the facsimile signal to the destination party on the predetermined information-unit basis, if the information to be transmitted is less than the predetermined information-unit, then the dummy information is attached to the information to be transmitted so that the information becomes the predetermined-unit of information. As a result, the portable facsimile equipment can transmit the information of the predetermined information-unit to the destination party.

According to the present invention, when the detection means detects the opened state of the lid means, the power supply means supplies power to the transmission/reception means, document preparation means and display means, while, when the power switch is turned ON and the detection means detects the closed state of the lid means, the power supply means inhibits supply of the power to the transmission/reception means, document preparation means and display means, whereby the power consumption of the portable facsimile equipment can be saved.

According to the present invention, the power supply means supplies power to the transmission/reception means, the document preparation means and the display means when the power switch is turned ON and when the detection means detects the opened state of the lid means; the power supply means inhibits its power supply to the transmission/reception means, the document preparation means and the display means when the power switch is turned ON and when the detection means detects the closed state of the lid means; and when the power switch is turned ON and when the detection means detects the closed state of the lid means, the operating data of the transmission/reception switch is invalidated. As a result, the power consumption can be saved and erroneous operation and erroneous transmission can be prevented.

According to the present invention, since the information inputted through the input means are stored in the recording means sequentially from a minimum or maximum address area and also management information associated with the information being stored are stored in the recording means sequentially form the maximum or minimum address area, the recording areas can be effectively used.

According to the present invention, when the information read out by the reading means and stored in the memory means are displayed on the display means, the information of the first resolution stored in the memory means is converted into information of the second resolution for the display means. As a result, the information stored in the memory means can be displayed on the display means.

According to the present invention, the control means, when receiving instruction for scroll display, scrollingly displays the information on the display means on a predetermined information-unit basis.

According to the present invention, since the information stored in the memory means is converted into a resolution for displaying on the display means on a predetermined information-unit basis, the handleability of the portable facsimile equipment can be improved.

According to the present invention, the control means, when receiving an instruction for scroll display, causes the information to be scrollingly displayed on the display means on the predetermined information-unit basis. As a result, the user can visually and easily see the information on the display and the handleability can be improved.

According to the present invention, since the control means causes the display means to display a level of the electric field intensity on the basis of information indicative of the electric field intensity detected by the detection means, the user can confirm the electric field intensity and also can take an effective measure on the electric field intensity displayed on the display means.

According to the present invention, the selection means selects the wired circuit means when the detection means detects the fact that the wired line is connected to the wired circuit means, while the selection means selects the radio circuit means when the detection means fails to detect that the wired line is connected to the wired circuit means, whereby the portable facsimile equipment can start its transmission reliably and quickly and the handleability thereof can be improved.

According to the present invention, since the facsimile signal is converted into data having a pixel density matching with an external device, excellent compatibility with the external device can be realized and the handleability can be improved.

According to the present invention, the control means, when an information reception request is detected during document preparation of the document preparation means, causes the display means to display thereon the information reception request and set an information path between the reception means and the second memory means to separate from a system associated with the document preparation. Thus, the portable facsimile equipment can have both the so-called word processor function and the facsimile function allowing double operation, and thus the handleability can be improved.

According to the present invention, since the communication circuit means performs communication with the wired line through the connector for the wired line connection provided in the side of the lid means and the received information is displayed on the display means, the user can confirm the received information and the handleability can be improved.

According to the present invention, since the speech headset accommodatable in the speech headset accommodation means provided in the upper surface of the equipment body is connected to the speech circuit means through the connector provided in the side of the lid means, the headset can be carried integrally with the equipment body.

According to the present invention, the display means for displaying thereon information received at the radio means is provided in the inside surface of the lid means, the antenna, the radio means and the speech circuit means are provided within the lid means, and a connector for connection between the speech handset and the speech circuit means is provided in a side of the lid means. Thus, there can be realized a portable facsimile equipment which can perform speech or data communication at a desired place with a highly improved handleability.

According to the present invention, the display means for displaying thereon information received at the radio means is provided on the inside surface of the lid means and the antenna and the radio means are provided within the lid means. As a result, there can be realized a portable facsimile equipment which can perform speech or data communication at a desired place with a highly improved handleability.

According to the present invention, since the display means is provided in the lid means covering the equipment body having a plurality of keys mounted thereon and the information read out by the reading means is displayed on the display means, the handleability can be improved.

According to the present invention, since the document insert means for inserting an original document to be read out by the reading means therethrough is opened or closed in response to the opening or closing of the lid means, it can be prevented that dust or foreign matter intrudes into the portable facsimile equipment through the document insert slot and thus deterioration of the equipment caused by dust invaded into the equipment can be prevented.

According to the present invention, since the gap defined between the equipment body and the lid means is covered with the covering plate by a resilient force when the lid means is closed, invasion of dust or the like into the portable facsimile equipment through the gap can be prevented and thus deterioration of the equipment caused by dust invaded into the equipment can be prevented.

According to the present invention, since the guide plate is moved in a longitudinal direction along the insert slot of the document insert means to match the width of the inserted document and thereby to prevent a lateral shift of the document being fed, the portable facsimile equipment can reliably read the document being fed.

According to the present invention, the feeding roller is provided as contacted with the reading surface of the reading means, the feeding roller is rotated by the rotational operation of the hand roller operatively connected with the feeding roller to feed the document to the reading means, and the information of the document is read out by the reading means and displayed on the display means provided on the inside surface of the lid means. As a result, there can be provided a portable facsimile equipment which can eliminate the necessity of using such driver means as a motor, can be made small in size and weight, and can remarkably reduce its power consumption.

According to the present invention, since the shutter covers the document discharging gap defined in the rear edge of the equipment body between the reading means and the equipment body when the reading means is mounted to the equipment body, it can be prevented that dust or the like invades into the portable facsimile equipment through the gap and thus deterioration of the portable facsimile equipment caused by the dust invaded into the equipment can be prevented.

According to the present invention, since the movement detection means supplies the detection information to the reading means during reading of the information of the document by the reading means, positive reading of the document information can be realized.

In this way, in accordance with the present invention, there can be provided a portable facsimile equipment having functions of a fixed type facsimile machine.

DESCRIPTION OF THE PREFERRED EMBODIMENTS

A portable facsimile equipment in accordance with an embodiment of the present invention will be detailed with reference to the attached drawings.

Figure 1:
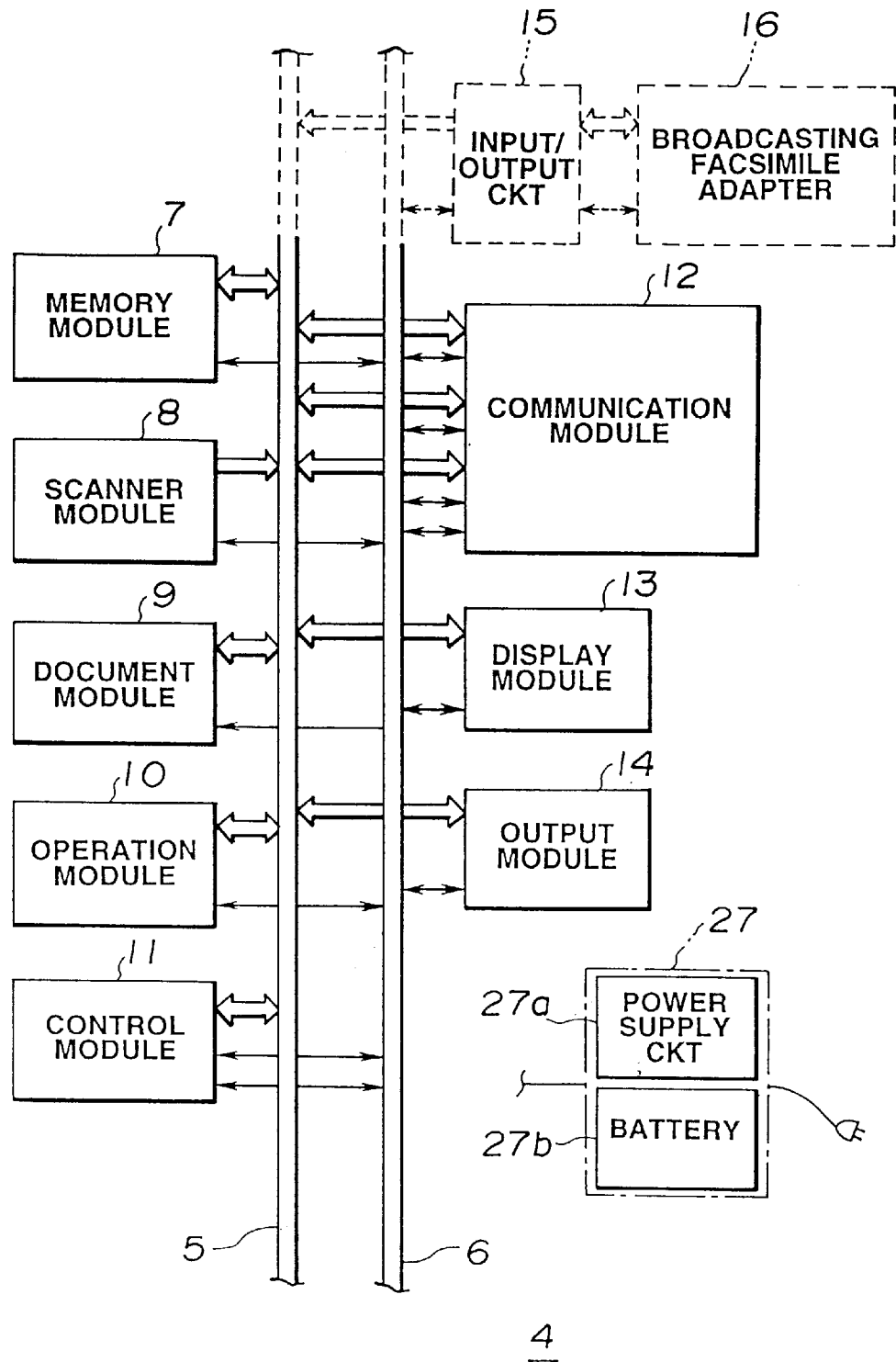
FIG. 1 is a block diagram of a circuit arrangement of a portable facsimile equipment in accordance with an embodiment of the present invention.

Referring first to FIG. 1, there is shown a block diagram of an exemplary circuit arrangement of a portable facsimile equipment in accordance with an embodiment of the present invention.

The portable facsimile equipment of FIG. 1 includes a body circuit 4 which comprises a memory module 7 for storing therein image data or the like received through a data bus 5 and a control bus 6, a scanner module 8 for reading the image data, a document module 9 for creating various sorts of documents, a control module 11 for performing various sorts of control through operation of the operating module 10, a communication module 12 for performing facsimile transmission/reception therethrough, a display module 13 for displaying thereon transmission/reception data, document data, message data, etc., and an output module 14 for outputting data, and a power supply 27 connected to the above respective modules.

In this connection, as an option, a broadcasting facsimile adaptor 16 may be connected to the data bus 5 and control bus 6 through an input/output circuit 15 as shown by broken lines to connect a broadcasting facsimile module to the broadcasting facsimile adaptor 16 or to connect a television output module to the above display module 13.

Explanation will next be made as to the respective parts of the portable facsimile equipment 4 by sequentially referring to FIGS. 2 to 9.

Figure 2:
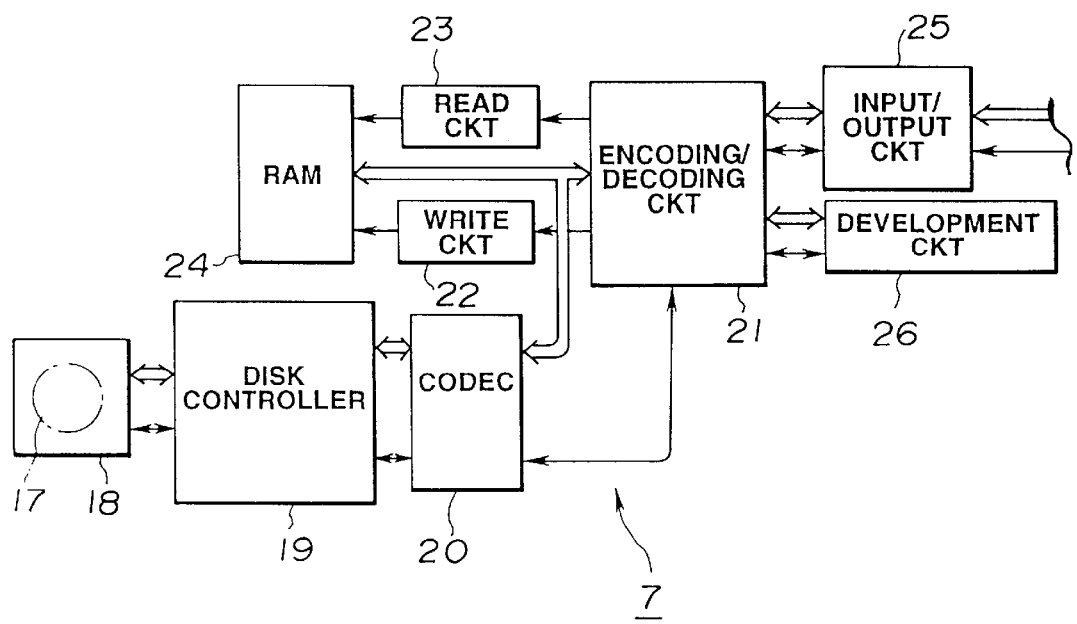
FIG. 2 is a block diagram of an arrangement of a memory module as one of major parts of the embodiment of the portable facsimile equipment of FIG. 1.

Shown in FIG. 2 is a block diagram of an arrangement of the memory module 7 of the portable facsimile equipment 4.

The memory module 7 of FIG. 2 includes a disk driving mechanism 18 for driving a disk 17 (such as floppy disk, hard disk or magneto-optical disk), a disk controller 19 for controlling the disk driving mechanism 18, a codec 20 for carrying out decoding of data received from the disk 17 and encoding (high-efficiency encoding) of data to record it on the disk 17, a RAM 24 as a working image memory, a write circuit 22 for supplying a control signal for data writing to the RAM 24, a read circuit 23 for supplying a control signal for reading data stored in the RAM 24, an input/output circuit 25 connected to the data and control buses 5 and 6 of FIG. 1 for performing input/output operation, and a development circuit 26 for converting (developing) a character code into pattern data.

Figures 10, 11:
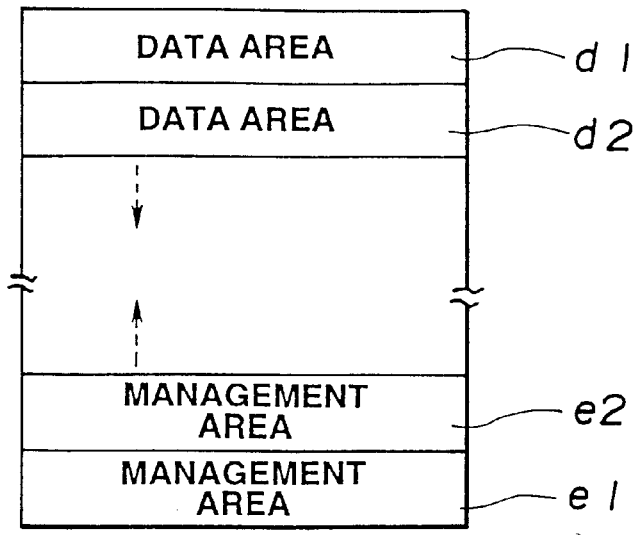
FIG. 10 is a structure of an memory area showing an exemplary memory format used in the portable facsimile equipment of the embodiment of the present invention.
FIG. 11 is a structure of a management area showing an exemplary memory format used in the portable facsimile equipment of the embodiment of the present invention.

The above RAM 24 comprises a RAM based on backup battery (VRAM or EEPROM). The disk 17 has a management area e (e1, e2, . . . ) and a data area d (d1, d2, . . . ) as shown in FIG. 10. In the drawing, addresses for the data area d are sequentially assigned thereto from lower addresses; while addresses for the management area e are sequentially assigned thereto from upper addresses, as shown by broken line arrows.

As shown in FIG. 11, the management area e is made up of a document name data Wn, a type code Co for determining whether document data is the character data (e.g., prepared by use of a word processor) or raster graphics data (data read in through a scanner to be described later or received data), an identification code Id, a header address Ad indicative of the lead address of the document data, and page number data Pa indicative of the number of pages of the document data.

The type code Co is made up of, for example, 2 bits. When the upper bit of the type code is "0", this indicates the absence of another document file; when the upper bit is "1", this indicates the presence of another document file; when the lower bit is "0", this indicates that the document data is of the raster graphics type; and when the lower bit is "1", this indicates that the document data is of the character type.

Figure 12:
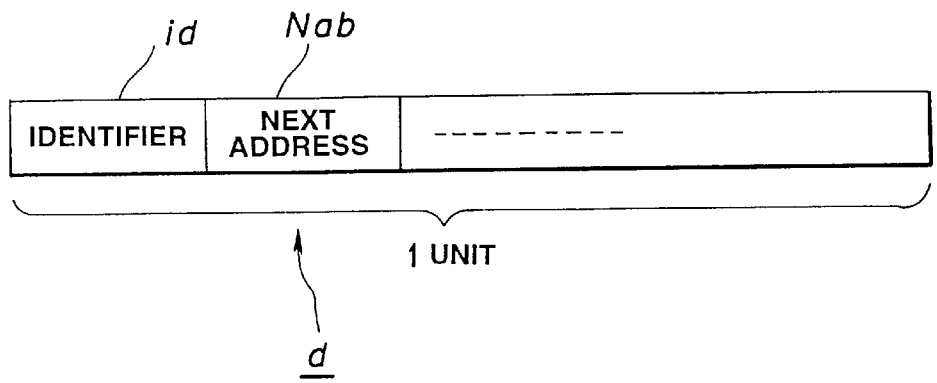
FIG. 12 is a structure of a file data area showing an exemplary memory format used in the portable facsimile equipment of the embodiment of the present invention.

Meanwhile, as shown in FIG. 12, each of the data areas d1, d2, . . . in the data area d comprises a single unit which has an identifier id indicative of whether or not the unit is blank (for example, the unit is blank when the id is "00", and the unit is in used when the id is "FF").

Figure 3:
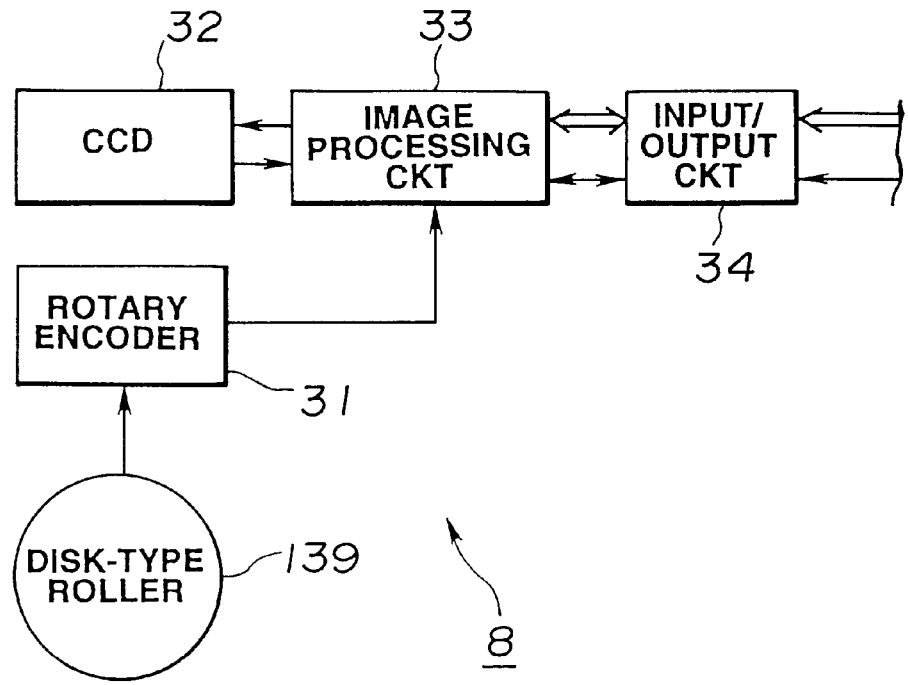
FIG. 3 is a block diagram of an arrangement of a scanner module as one of the major parts of the embodiment of the portable facsimile equipment of FIG. 1.

FIG. 3 is a block diagram of an internal structure of the scanner module 8 of the portable facsimile equipment 4 of FIG. 1.

The scanner module 8 of FIG. 3 includes a disk-shaped roller 139, a rotary encoder 31 for detecting a rotational angle of the disk-shaped roller 139, a CCD element 32 for reading image data on an original document, an image processing circuit 33 for subjecting a read image signal received from the CCD element 32 to an image processing (correction) in accordance with a detection signal received from the rotary encoder 31, and an input/output circuit 34 connected to the data and control buses 5 and 6 for performing data input/output operations. In the illustrated example, the CCD element 32 outputs the read image signal as a facsimile line signal (e.g., 8 lines/mm).

Figure 4:
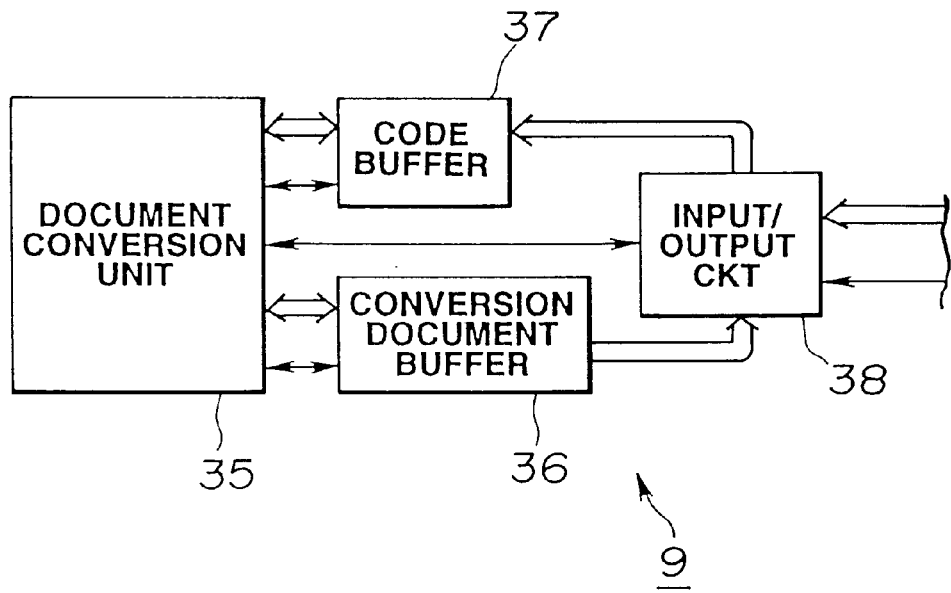
FIG. 4 is a block diagram of an arrangement of a document module as one of the major parts of the embodiment of the portable facsimile equipment of FIG. 1.

FIG. 4 is a block diagram of an internal structure of the document module 9 of the portable facsimile equipment 4 of FIG. 1.

The document module 9 of FIG. 4 includes an input/output circuit 38 connected to the data and control buses 5 and 6 of FIG. 1 for performing data input/output operations, a converted-document buffer 36, a code buffer 37, and a document conversion unit 35 having a general function as a so-called word processor. The document module 9 comprises, for example, an integrated circuit used in a general word processor.

Figure 5:
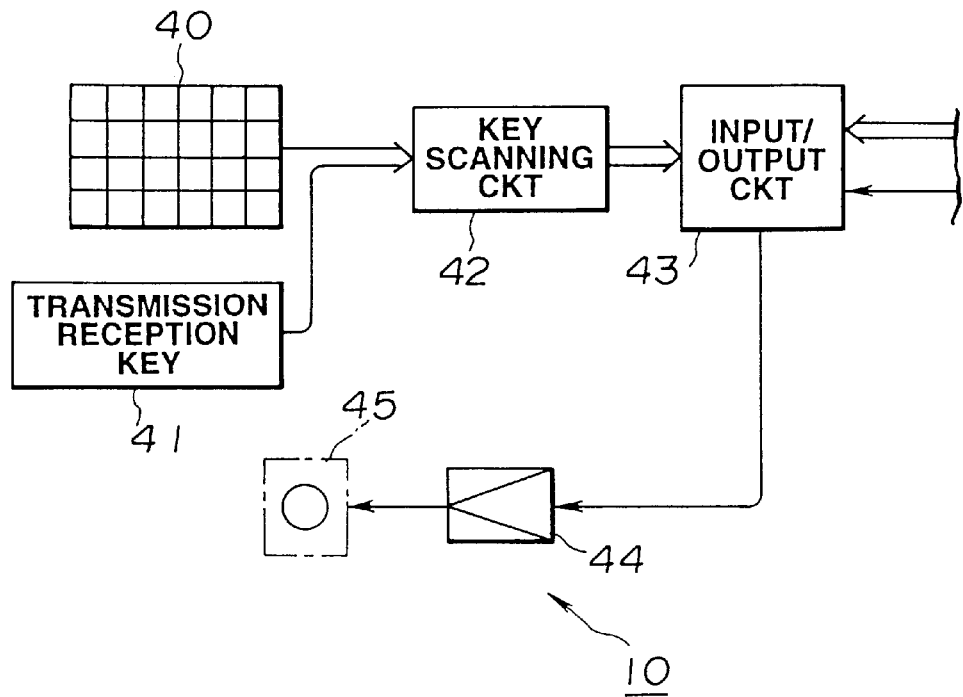
FIG. 5 is a block diagram of an arrangement of an operating module as one of the major parts of the embodiment of the portable facsimile equipment of FIG. 1.

Shown in FIG. 5 is a block diagram of an internal structure of the operating module 10 in the portable facsimile equipment 4 of FIG. 1.

The operating module 10 of FIG. 5 includes a keyboard (whose interior forms a full key matrix) 40 corresponding to that of a word processor, a transmission/reception key 41 for starting facsimile transmission/reception, a key scanning circuit 42 for outputting a signal corresponding to a depressed key, an input/output circuit 43 connected to the data and control buses 5 and 6 of FIG. 1 for performing data input/output operations, an amplification circuit 44 for amplifying a signal received from the input/output circuit 43 indicative of, for example, transmitting/receiving operation or battery drop, and a plurality of LEDs 45 for emitting light when receiving a signal from the amplification circuit 44.

Figure 6:
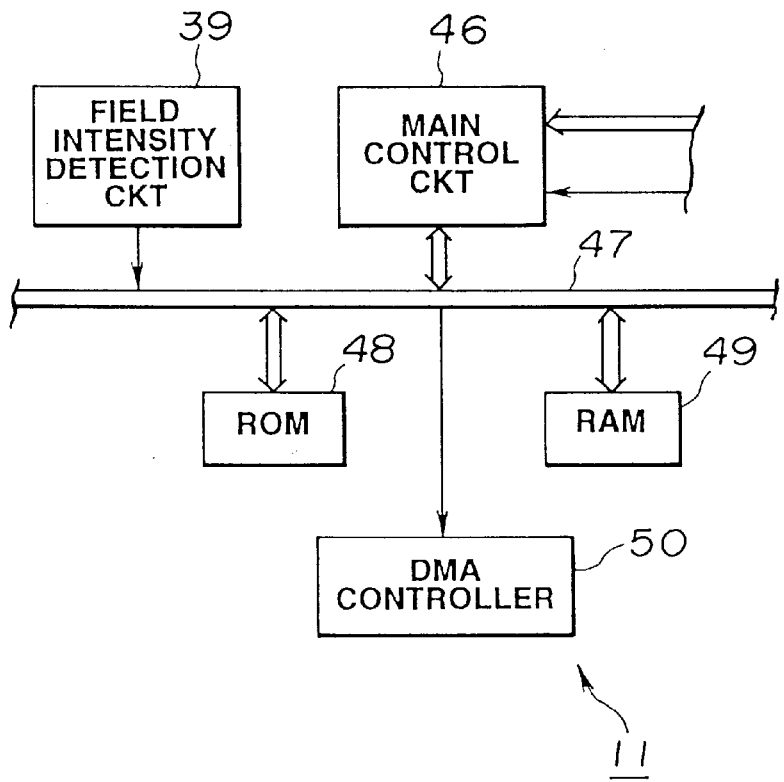
FIG. 6 is a block diagram of an arrangement of a control module as one of the major parts of the embodiment of the portable facsimile equipment of FIG. 1.

FIG. 6 is a block diagram of the control module 11 in the portable facsimile equipment 4 of FIG. 1.

The control module 11 of FIG. 6 includes a main control circuit 46 connected to a bus 47 (including address, control and data buses) for performing general control over, e.g., data input/output, a ROM 48 connected to the bus 47 for storing therein program data and other related data, a working RAM 49 connected to the bus 47, a DMA controller 50 connected to the bus 47, and an electric-field intensity detection circuit 39 for detecting an electric field.

The control module 11, when receiving a signal indicative of generation of an error from the communication module 12 due to a trouble during data transmission, controls the memory module 7 to cause data which includes the error part corresponding, e.g., to one page, to be again read out from the memory module and then transmitted to the communication module 12.

When data to be transmitted corresponds to less than a predetermined page, the control module 11 supplies a control signal to the memory module 7 to add, for example, white line data thereto to form one page of data for its later transmission.

Electric field data detected by the electric-field intensity detection circuit 39 is supplied to the display module 13 (to be described later) to be displayed on an LCD display 84 of the display module 13, or when the detected field intensity exceeds a predetermined value, the detected intensity is supplied to the operating module 10 to, for example, emit light from the LED 45 of the operating module 10.

Figure 7:
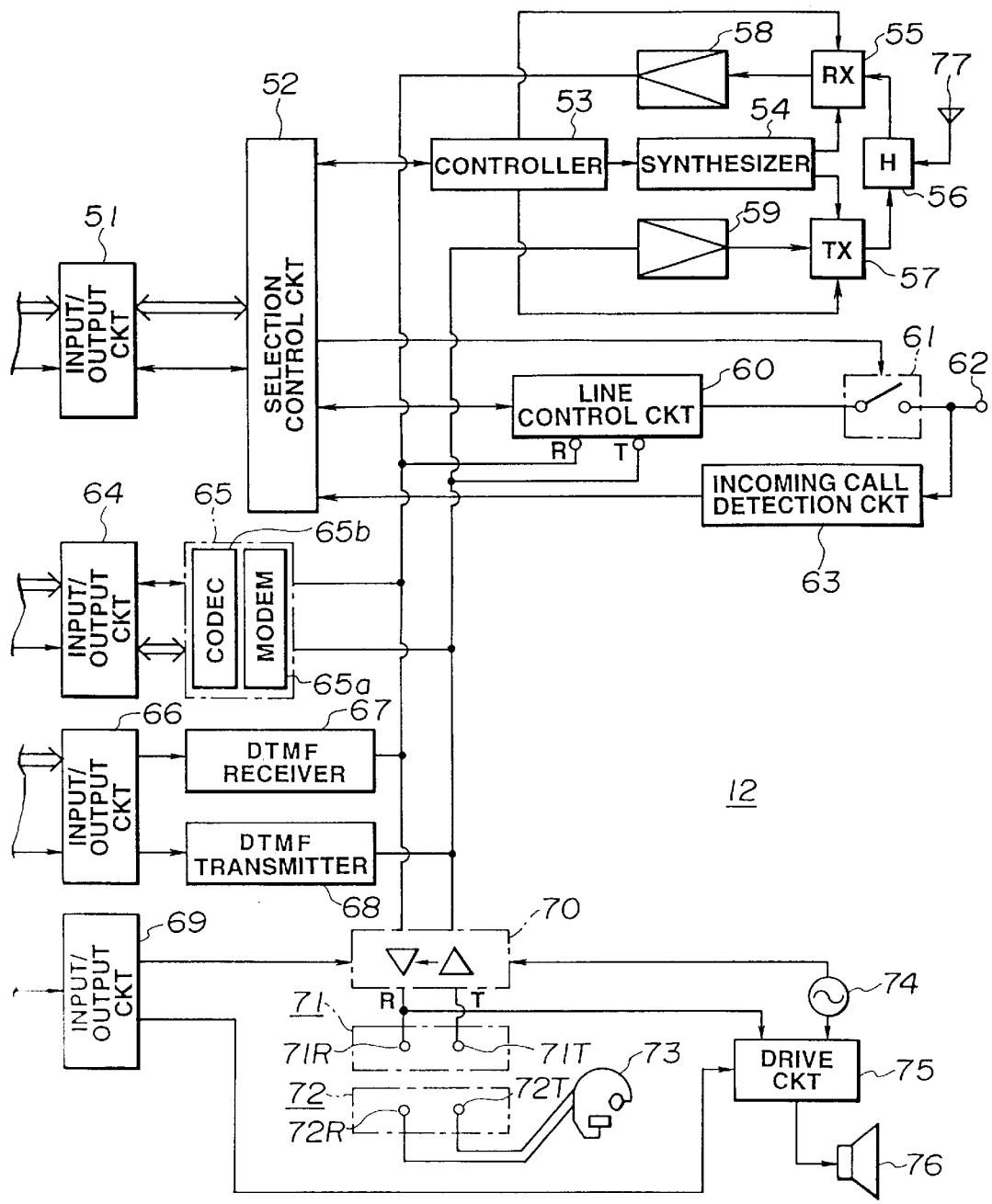
FIG. 7 is a block diagram of an arrangement of a communication module as one of the major parts of the embodiment of the portable facsimile equipment of FIG. 1.

FIG. 7 is a block diagram of an internal structure of the communication module 12 in the portable facsimile equipment 4 of FIG. 1.

The communication module 12 of FIG. 7 includes an input/output circuit 51 connected to the data and control buses 5 and 6 of FIG. 1 for performing data input/output operations, radio and wired circuit systems, an input/output circuit 64 connected to the data and control buses 5 and 6 of FIG. 1 for performing data input/output operations, a transmission/reception processing circuit 65 having a modem 65a and a codec 65B for performing data encoding/decoding operation, an input/output circuit 66 connected to the data and control buses 5 and 6 of FIG. 1 for performing data input/output operations, a DTMF receiver 67, a DTMF transmitter 68, an input/output circuit 69 connected to the data and control buses 5 and 6 of FIG. 1 for performing data input/output operations, a speech circuit 70 for speech, a jack 71 having signal receiving terminal 71R and a signal transmitting terminal 71T, a plug 72 having a signal receiving terminal 72R and a signal transmitting terminal 72T, a headset (e.g., of a folding or collapsible type) 73 having the plug 72, and a drive circuit 75 controlled by the input/output circuit 69 for receiving a receive signal from a signal receiving terminal R of the speech circuit 70 and also receiving a signal from a bell source 74 and for outputting the signal from the bell source to a loudspeaker 76 to inform the user of the presence of the received signal.

The aforementioned radio circuit system includes a duplexer (for example, hybrid) 56 connected with an antenna (of a monopole type) 77, receiver (RX) 55 for receiving a receive signal through the antenna 77 and the duplexer 56, an amplifier 58 for amplifying the receive signal received at the receiver 55, an amplification circuit 59 for amplifying a signal to be transmitted, a transmitter 57 for sending the transmit signal amplified at the amplification circuit 59 through the duplexer 56 to the antenna 77 to transmit it therefrom, a synthesizer 54 for supplying demodulating and modulating signals to the receiver 55 and transmitter 57, and a controller 53 for controlling the synthesizer 54, receiver 55 and transmitter 57 respectively.

Meanwhile, the aforementioned wired circuit system includes a terminal (such as a modular connector) 62 connected to a line, an incoming-call detection circuit 63 for detecting the presence or absence of an incoming call received through the terminal 62, a line control circuit 60 having signal transmitting and receiving terminals R and T for performing line control, and a line relay 61 for performing its ON/OFF operation based on a control signal received from a selection control circuit 52 to provide an interconnection or disconnection with or from the line.

When an error takes place due to a trouble in the above wired or radio circuit system during data transmission, the occurrence of the error is informed to the control module 11.

Figure 8:
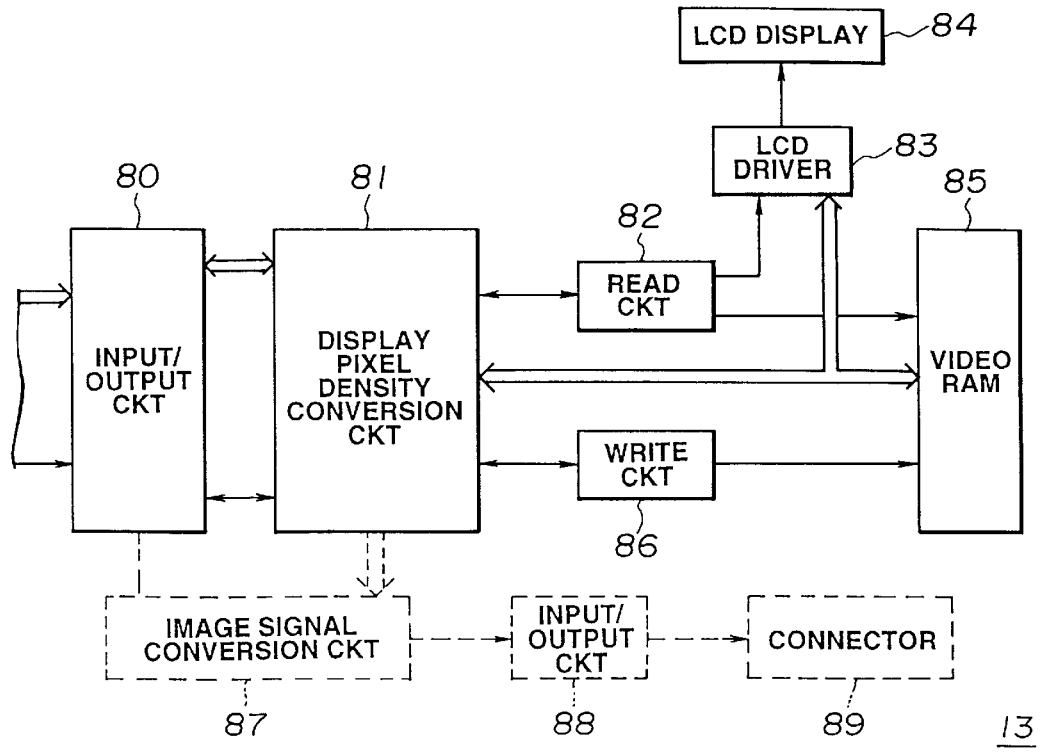
FIG. 8 is a block diagram of an arrangement of a display module as one of the major parts of the embodiment of the portable facsimile equipment of FIG. 1.

Turning to FIG. 8, there is shown a block diagram of an internal structure of the display module 13 in the portable facsimile equipment 4 of FIG. 1.

The display module 13 of FIG. 8 includes an input/output circuit 80 connected to the data and control buses 5 and 6 of FIG. 1 for performing data input/output operations, a displaying pixel density conversion circuit 81 for subjecting pixel density data corresponding to facsimile image data received from the memory module 7 of FIG. 7 to a pixel density converting operation, such as a decimating operation, to convert it into display data, a read circuit 82 for reading data from the displaying pixel density conversion circuit 81, a video RAM 85 for storing therein the display data read out from the read circuit 82, a write circuit 86 for writing data in the video RAM 85, an LCD driver 83 for driving the LCD display 84, and the already-explained LCD display 84 for displaying under control of the LCD driver 83 the display data written in the video RAM 85.

In the illustrated example, the LCD display 84 is of a dot matrix type used in a general personal computer or word processor, has a resolution of 3 lines/mm and a display unit of 6mm (corresponding to 48 lines in the scanner 104 and 18 lines in the LCD display).

Display data in the video RAM 85, which has data memory areas from storage of document data for before-transmission and from after-transmission, is input or output on a 6 mm (corresponding to 48 lines in the scanner 104 and 18 lines in the LCD display) display unit basis.

As shown by broken lines in the drawing, as an option, there may be provided a video signal conversion circuit 87 for converting the display data from the displaying pixel density conversion circuit 81 into, e.g., a video signal of an NTSC, PAL or SECAM system, an input/output circuit 88 and a connector 89; and a television output module may be connected to the connector 89.

Figure 9:
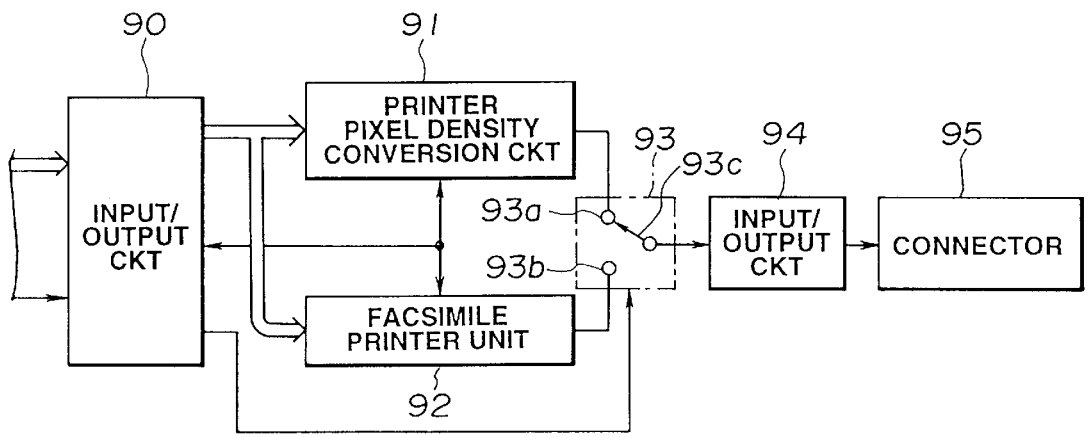
FIG. 9 is a block diagram of an arrangement of an output module as one of the major parts of the embodiment of the portable facsimile equipment of FIG. 1.

FIG. 9 is a block diagram of an internal structure of the output module 14 in the portable facsimile equipment 4 of FIG. 1.

The output module 14 of FIG. 9 includes an input/output circuit 90 connected to the data and control buses 5 and 6 of FIG. 1 for performing data input/output operations, a printer pixel density conversion circuit 91 for converting, e.g., facsimile image data into printer image data for a printer such as used in a personal computer, a facsimile printer unit 92 for printing the facsimile image data on thermal paper or the like, a switch 93 for performing change-over between outputs of the printer pixel density conversion circuit 91 and facsimile printer unit 92, an input/output circuit 94 for performing input/output operation of output data received from the switch 93, and a connector 95 for connection with an external device (such as a facsimile device or a serial printer).

Switching of the output of the output module 14 is carried out by connecting an output terminal of the printer pixel density conversion circuit 91 to a fixed contact 93a of the switch 93, connecting an output terminal of the facsimile printer unit 92 to a fixed contact 93b of the switch 93, and then selectively connecting a movable contact 93c of the switch 93 to the fixed contact 93a or 93b under control of a switching signal received from the input/output circuit 90.

When the output module 14 outputs the facsimile signal to the external device, the display module 13 is controlled on the basis of the signal received from the output module 14 so that such a message as, for example, "Outputting to the serial printer (or facsimile device)" appears on the display screen of the LCD display 84.

Explanation will next be made as to the appearance and respective mechanisms of the portable facsimile equipment of the present embodiment, by referring to FIGS. 13 to 20.

Figure 13:
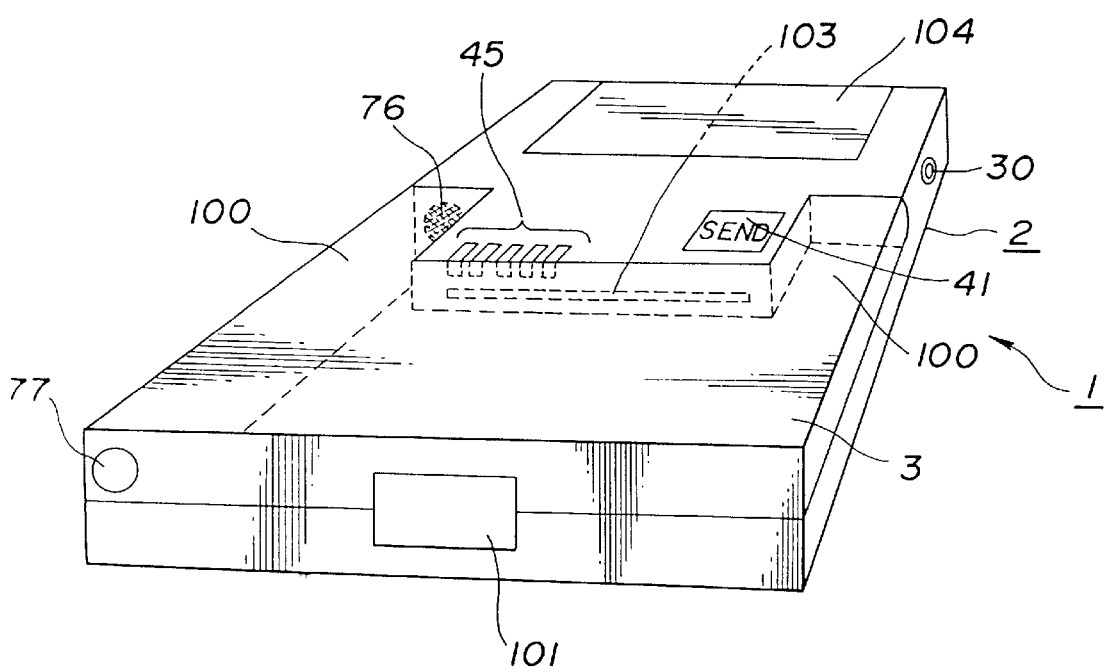
FIG. 13 is a partly seen-through perspective view of the portable facsimile equipment of the embodiment of the present invention.
Figure 14:
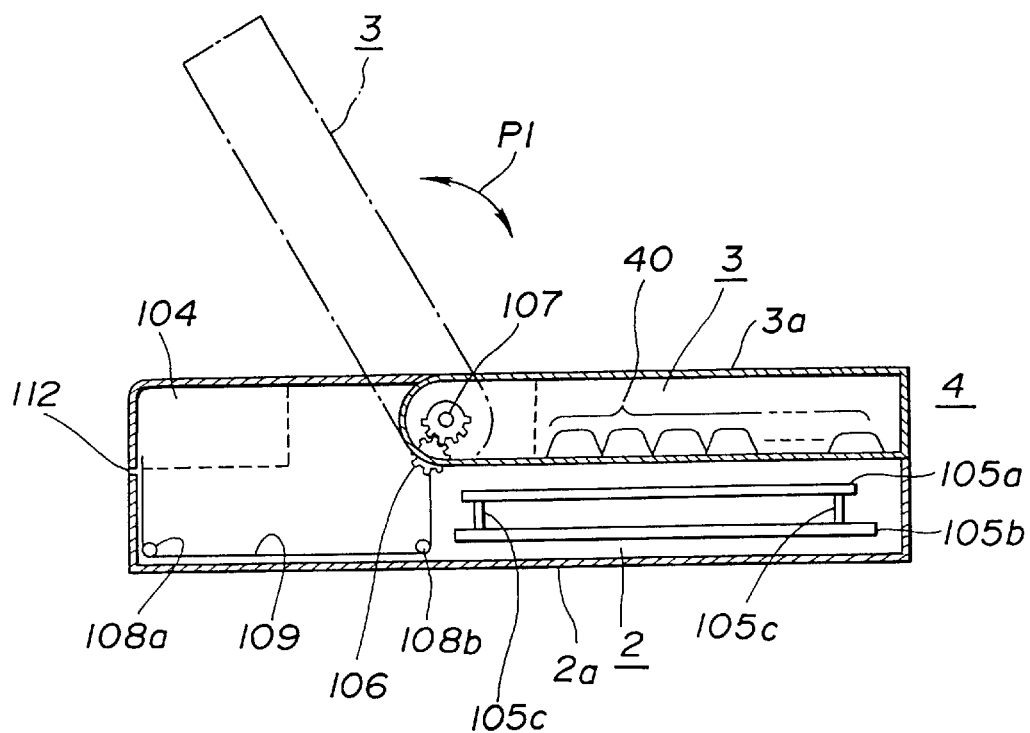
FIG. 14 is a side view, as partly seen through, of the portable facsimile equipment of FIG. 13.

FIG. 13 is a perspective view, as partly seen therethrough, of the portable facsimile equipment 1, and FIG. 14 is a side view, as partly shown by a cross-sectional view, of the portable facsimile equipment 1 of FIG. 13.

As shown in FIGS. 13 and 14, the portable facsimile equipment 1 includes a body 2 to which the LCD driver 83 and LCD display 84 of the display module 13 of FIG. 8 is mounted and also to which an LCD board 3 as a lid is pivotally mounted by means of a hinge mechanism (not shown) of an arm part 100 of the LCD board.

In the illustrated example, the portable facsimile equipment body 2 includes a casing 2a in which a major part of the body circuit 4 is housed. The body circuit 4 includes circuit boards 105a and 105b having such various circuit modules as shown in FIGS. 1 to 9 mounted thereon as well as a spacer 105c disposed as connected between the boards 105a and 105b. Further mounted above the circuit board 105a is the keyboard 40 in the operating module 10 shown in FIG. 5. Detachably mounted in a rear part of the casing 2a is a scanner 104 which includes the scanner module 8 shown in FIG. 3. Further, the plurality of LEDs 45 and transmission/reception key 41 of the operating module 10 of FIG. 5 are mounted on the upper surface of a step part of the casing 2a. The step part is provided in its front side with an original document insert slot 103 at its middle position as shown by a broken line in FIG. 13.

The LCD board 3 includes a casing 3a to which the extendable antenna 77 in the radio circuit system of the communication module 12 of FIG. 7 is mounted. An engagement 101 is provided to the front side of the LCD board casing at its center for fixing a mounted position when the LCD board casing is mounted on the body casing 2a and for holding such a shape as suitable to its carrying. Mounted within the LCD board casing 3a are the LCD driver 83 and LCD display 84 of the display module 13 of FIG. 8. The radio circuit system of the communication module 12 of FIG. 7 is mounted as shielded within the board casing in the vicinity of the antenna 77 to form a double structure. Further mounted in the vicinity of the radio circuit system are such wired circuit system and selection control circuit 52 as shown in FIG. 7. Mounted to the internal arm part 100 is the jack 71 into which the plug 72 of the headset 73 of FIG. 7 is to be plugged. The loudspeaker 76 of the communication module 12 of FIG. 7 is mounted in the vicinity of the arm part 100. The terminal (modular connector) 62 for connection between the wired circuit system of FIG. 7 and the external line is mounted in the vicinity of the loudspeaker 76.

When the user lifts the LCD board 3 in a direction shown by a solid line arrow P1 and moves it to such a position shown by a chain-dotted line in FIG. 14, the LCD board 3 is open, e.g., 120 degrees with respect to the portable facsimile equipment body 3, in which case the user can watch the display screen of the LCD display 84 disposed inside the portable facsimile equipment from the right side (in FIG. 14).

Further, a fixed gear 107 is mounted to the LCD board 3 and a gear 106 is mounted to the portable facsimile equipment body 2 as shown in FIG. 14, so that, when the LCD board 3 is mounted on the portable facsimile equipment body 2 as closed thereon, these gears 107 and 106 are meshed with each other. Further mounted to the gear 106 is a shutter mechanism 109.

Figure 16A:
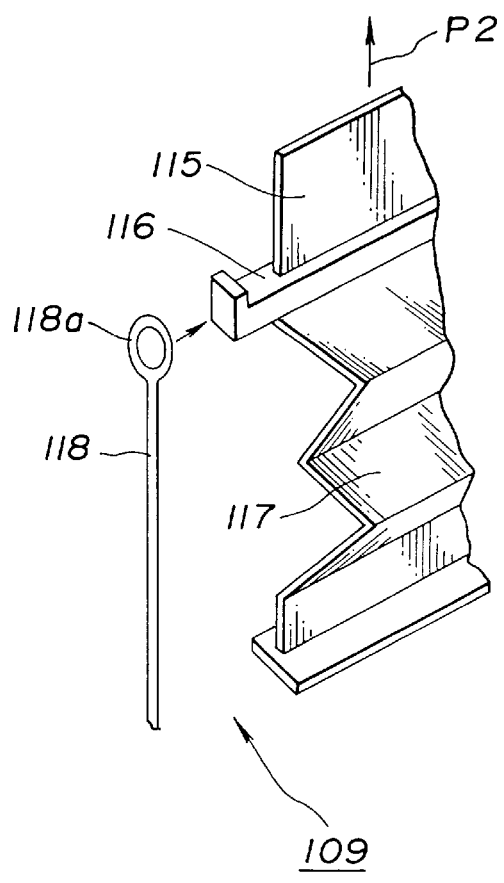
FIGS. 16(A) and 16(B) show a perspective view and a side view of a shutter mechanism used in the portable facsimile equipment of FIG. 13.
Figure 16B:
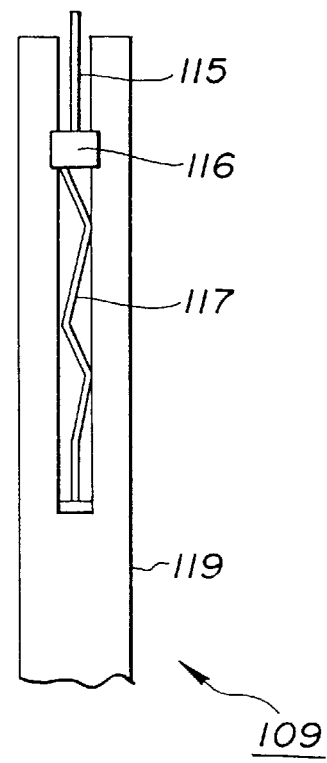

The shutter mechanism 109 is arranged so that, as shown in FIG. 16A, a shutter 115 is connected to an engagement member 116, a plate spring 117 is connected to the engagement member 116, a ring 118a of a wire 118 is hooked at a projection of the engagement member 116, these members are mounted in a guide rail 119 as shown in FIG. 16B. The wire 118 is attached at its one end to the gear 106 of the portable facsimile equipment body 2 of FIG. 14, and further guided by guides 108a and 108b.

As shown in FIG. 16A, the shutter 115 is pushed always upwards (in such a direction as to close a gap between the portable facsimile equipment body 2 and the scanner 104) by a biasing force (shown by an arrow P2 in the drawing) of the engagement member 116.

Accordingly, when the user lifts the LCD board 3 of the portable facsimile equipment 1 and rotates it as shown by the arrow P1 to such a position as shown by the chain-dotted line as shown in FIG. 14, this causes rotation of the gear 107 and thus rotation of the gear 106, whereby the shutter 115 is pulled so that the gap between the scanner 104 and portable facsimile equipment body 2 is opened. (FIG. 14 shows a state when the LCD board 3 is closed.) When the user pushes down the LCD board 3 of the portable facsimile equipment 1 and rotates it as shown by the arrow P1 from the chain-dotted position to such a position as shown by the solid line, on the other hand, this causes the gear 106 to be rotated so that the wire 118 shown in FIG. 16 returns to its original state from its wound state, whereby the shutter 118 is pushed upwards against the biasing force of the engagement member 117, which results in that the gap between the scanner 104 and the portable facsimile equipment body 2 is covered with the shutter 115.

Therefore, intrusion of dust or foreign matter into the portable facsimile equipment through a document discharging slot 112 defined between the scanner 104 and the portable facsimile equipment body 2 can be minimized, thereby preventing deterioration of the quality of a printed image caused by dust or the like.

Figure 17:
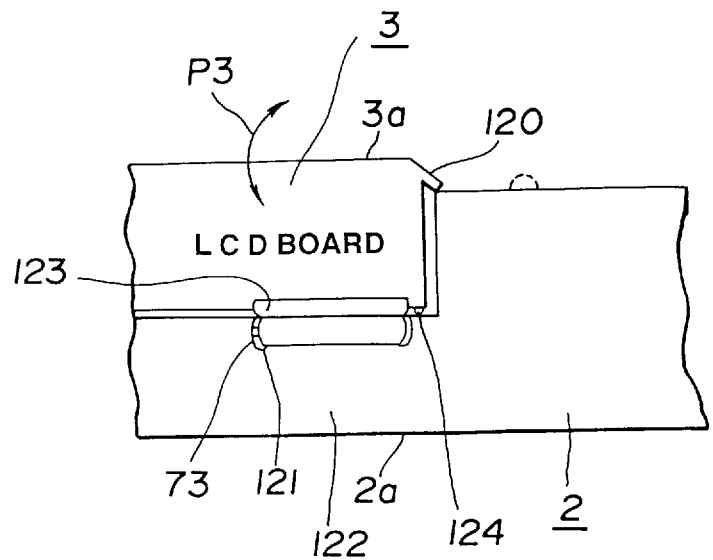
FIG. 17 is an appearance view of a part of the portable facsimile equipment of FIG. 13.

As shown in FIG. 17, a headset accommodation recess 121 for accommodating the headset 73 of the communication module 12 of FIG. 7 therein is formed in the casing 2a of the portable facsimile equipment body 2 in the vicinity of an interconnection with the LCD board 3. The headset accommodation recess 121 is provided therein with a projection 122 so that the shape of the recess 121 coincides with that of the headset 73 accommodated in the recess 121. A sponge member 123 is provided in order to restrict a positional shift of the headset 73 accommodated within the headset accommodation recess 121 when the user rotates the LCD board 3 as shown by an arrow P3 in FIG. 17 to its closed position and also in order to absorb shock and vibration to the headset 73 during carrying of the portable facsimile equipment.

An elastic piece (dust-proof plate) 120 is provided to the casing 3a of the LCD board 3 so that, when the user rotates the LCD board 3 as shown by the arrow P3 to open or close the LCD board as shown in FIG. 17, this opening/closing movement of the LCD board causes an elastic piece (dust-proof plate) 120 to extend. The provision of this elastic piece 120 enables dust or the like intruding into the portable facsimile equipment through the gap between the LCD board 3 and the portable facsimile equipment body 2 to be minimized.

Further, a switch 124 is provided so that, when the user opens or closes the LCD board 3 by rotating it as shown by the arrow P3 in FIG. 17, the switch 124 is turned ON or OFF in response to the opening or closing operation of the LCD board 3. Thus, an ON/OFF signal issued from the switch 124 operated in response to the opening/closing operation of the LCD board 3 is used, for example, to cause the control module 11 to control the power supply 27, thereby turning ON or OFF power supply to the memory module 7, scanner module 8, document module 9, communication module 12, display module 13 and output module 14. With such an arrangement, when the LCD board 3 is closed for example, the power consumption of the portable facsimile equipment can be reduced.

Figure 15:
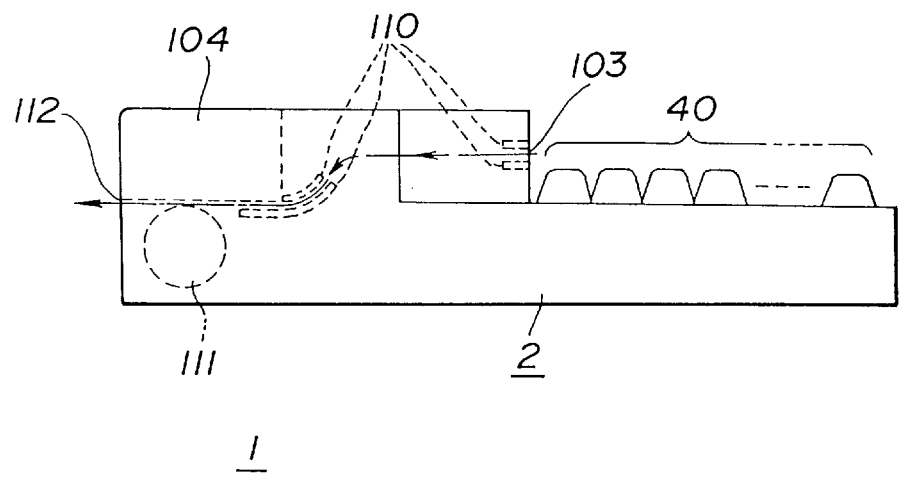
FIG. 15 is a side view, as partly seen through, of the portable facsimile equipment of FIG. 13.

The document feed path system of the portable facsimile equipment 2 includes, as shown in FIG. 15, the original document insert slot 103, a plurality of guide plates 110 for guiding the document inserted through the document insert slot 103, a platen roller 111 having a contact part made of rubber material for feeding the document, and an original document discharge slot 112. With such a structure, the document inserted through the document insert slot 103 is guided as shown by a chain-dotted line and discharged from the document discharging slot 112.

Explanation will now be made as to the mechanism of the platen roller 111 for discharging from the document discharging slot the document inserted through the document insert slot 103 by referring to FIG. 18.

Figure 18:
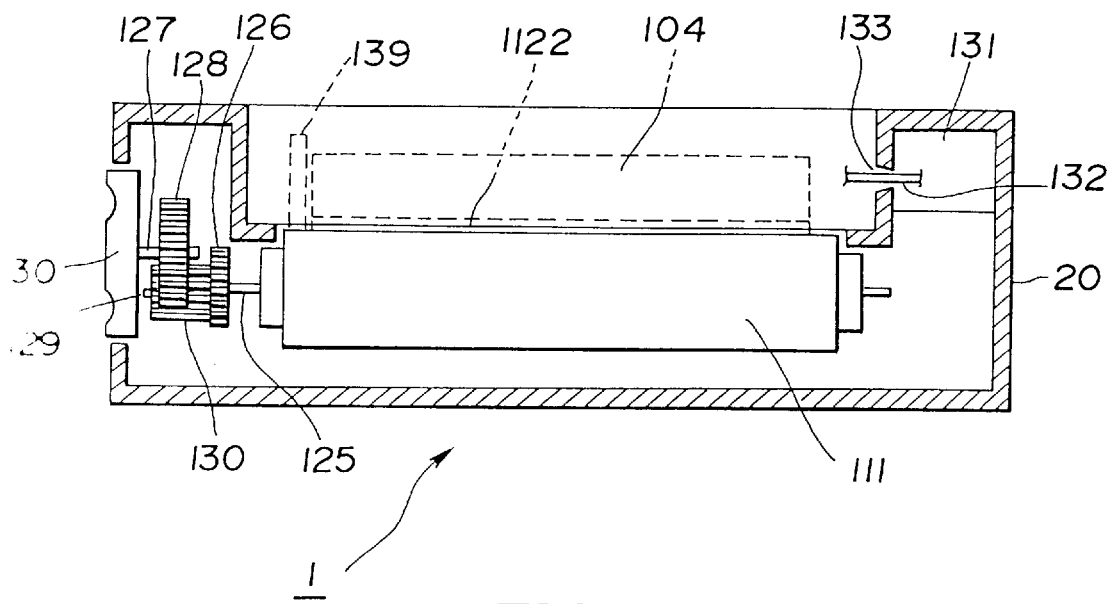
FIG. 18 is a structure of an example of an original document feeding mechanism used in the portable facsimile equipment of FIG. 13.

As shown in FIG. 18, in the mechanism of the platen roller 111, a gear 126 is mounted onto a shaft 125 of the platen roller 111, a gear 128 is mounted onto a shaft 127 of a hand roller 30, a gear 130 is mounted onto a shaft 129 attached, e.g., to an inside wall (not shown) of the casing 2a, and the gears 126 and 128 are meshed with the gear 130 respectively.

The hand roller 30 is manually rotated. When the hand roller 30 is manually rotated, a manual driving power is transmitted sequentially to the gears 130, 128 and 126 in this order so that the platen roller 111 is rotated, whereby the document inserted through the document insert slot 103 is fed to be read by the scanner 104.

Since the above arrangement can be realized without using any motor for example, the portable facsimile equipment 1 can be made small in size and weight, lightening a user's burden during carrying of the equipment. Further, since provision of a driver for the motor can be eliminated, the power consumption of the portable facsimile equipment can be remarkably reduced.

As shown in FIG. 18, a reel part 131 for housing therein a lead wire 132 electrically connecting the scanner 104 and portable facsimile equipment body 2 is provided within the casing 2a of the portable facsimile equipment body 2, and further a lead-out port 133 for leading out the lead wire is made in a part of the casing 2a where the scanner 104 is mounted.

The reel part 131 is structured so as to, for example, wind the lead wire 132 by mean of spring power. The wire lead-out port 133 is formed into a conical shape to prevent damage of the outer skin of the lead wire 132 when the lead wire 132 is wound in or led out from the reel part 131.

Explanation will next be made as to the scanner 104 by referring to FIG. 19.

Figure 19:
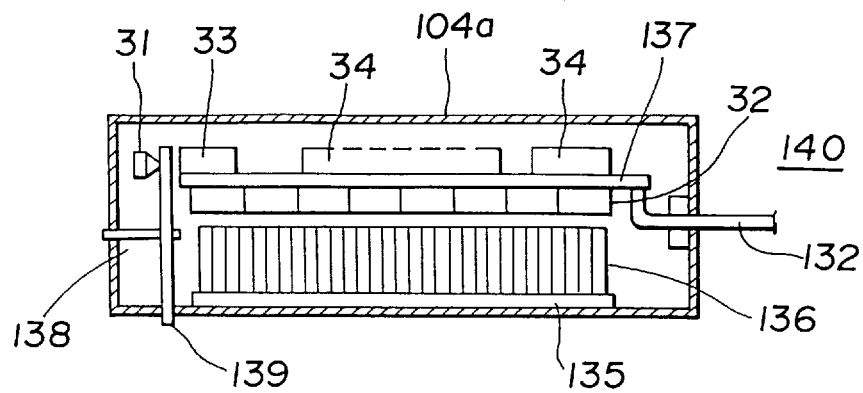
FIG. 19 is a structure of an example of the scanner mechanism used in the portable facsimile equipment of FIG. 13.

In the scanner 104 of FIG. 19, a cell hook lens 136 is mounted on a glass plate 135, the CCD element 32 of the scanner module 8 of FIG. 3 is mounted on a lower side of a substrate 137 while the image processing circuit 33 and input/output circuit 34 of FIG. 3 is mounted on an upper side of the substrate 137, the substrate 137 having these elements mounted thereon is housed in a scanner casing 104a. More specifically, a shaft 138 is fixedly attached to the scanner casing 104a, the disk-shaped roller 139 of FIG. 3 is mounted onto the shaft 138, the rotary encoder (including a photocoupler, etc.) for detecting a rotational angle of the disk-shaped roller 139 is disposed within the scanner casing 104a, and the image processing circuit 33 and input/output circuit 34 mounted on the substrate 137 are electrically connected to the portable facsimile equipment body 2 through the lead wire 132.

In FIG. 18, when the scanner 104 is mounted to the portable facsimile equipment body 2, a gap defined between the scanner 104 and portable facsimile equipment body 2 is used as the document discharging slot 112. When the scanner 104 is mounted to the portable facsimile equipment body 2 as shown by broken lines in FIG. 18, the disk-shaped roller 139 abuts against the platen roller 111. Accordingly, with the scanner 104 mounted to the portable facsimile equipment body 2, when a document sheet is inserted through the document insert slot 103 and then the hand roller 30 is manually rotated, the platen roller 111 is rotated and the disk-shaped roller 139 is correspondingly rotated, so that the rotary encoder 31 of the scanner 104 detects a rotational angle and also reads out data from the document.

When the scanner 104 is dismounted from the portable facsimile equipment body 2 and moved while tightly contacted with the document, this causes the disk-shaped roller 139 to rotate, whereby the rotary encoder 31 of the scanner 104 detects a rotational angle and reads out data from the document.

With the scanner 104 dismounted from or mounted on the portable facsimile equipment body 2, data read out from the document is supplied to the portable facsimile equipment body circuit 4 of FIG. 1 through the lead wire 132.

Figure 20A:
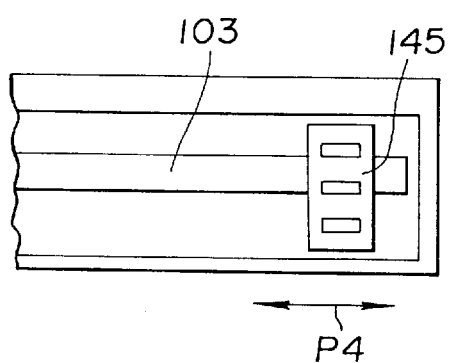
FIGS. 20(A) and 20(B) show appearance views of an example of an original document guide used in the portable facsimile equipment of FIG. 13.

As shown in FIG. 20A, a document guide 145 is provided to the document insert slot 103.

Figure 20B:
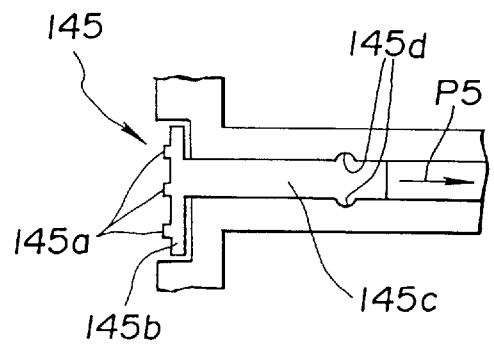

The document guide 145, as shown in FIG. 20B, is provided with projections 145a, guide parts 145b and 145c and second projections 145d. The document guide 145 is used by moving it to a position corresponding to, e.g., document size (B5, B4, A3, A4, etc.) as shown by an arrow P4. Mounting of the document guide 145 is carried out by inserting the document guide 145 into the document insert slot 103 at the document corresponding position in a direction shown by an arrow P5 as shown in FIG. 20B. When the document guide 145 is inserted as shown in FIG. 20B, the recess of the document insert slot 103 can accommodate the projections 145a and guide part 145b therein to prevent their projection therefrom. After the document guide 145 is inserted, the document guide 145 can be firmly fixed by means of the projections 145d, whereby the document can be stably and smoothly fed.

Figure 21:
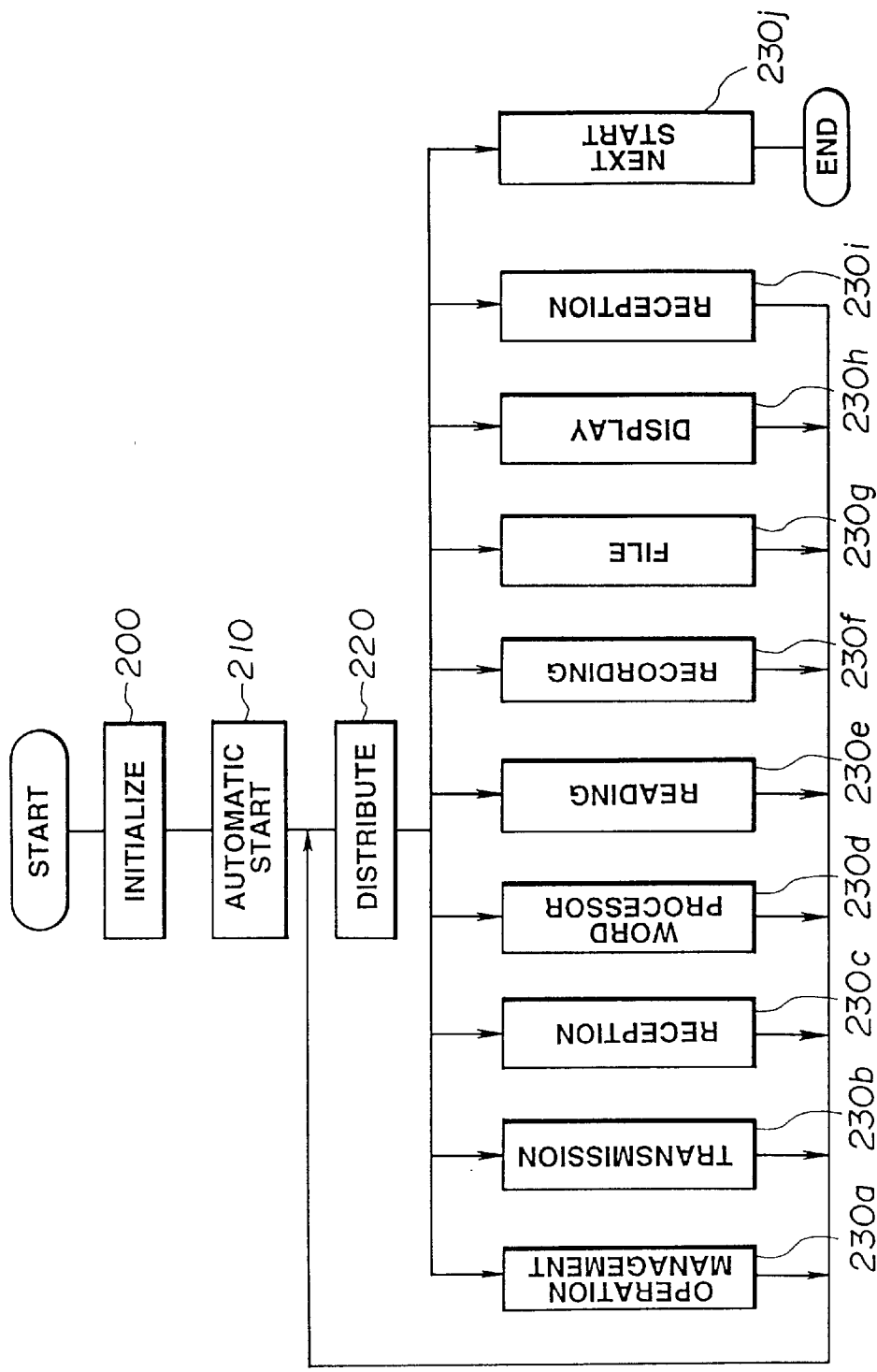
FIG. 21 is a flowchart for explaining the operation of the portable facsimile equipment of the embodiment of the present invention.

The operation of the portable facsimile equipment will be explained by referring to FIG. 21.

When a power switch (it shown) is turned ON, the control module 11 performs its initializing operation (step 200), after which the control module 11 performs its automatic starting operation (step 210) and then performs operation distribution according to the operation of the operating module 10 (step 220).

After performing the distributing operation, the control module 11 performs operation management (step 230a), transmission (step 230b), reception (step 230c) and incoming-signal processing (step 230i) by the communication module 12, performs word processing (step 230d) by the document module 9, reading operation (step 230e) by the scanner module 8, performs recording operation (step 230f) and filing operation (step 230g) by the memory module 7, performs displaying operation (step 230h) by the display module, and next starting operation (step 230j) by the control module 11, according to the distributing operation.

Figure 22:
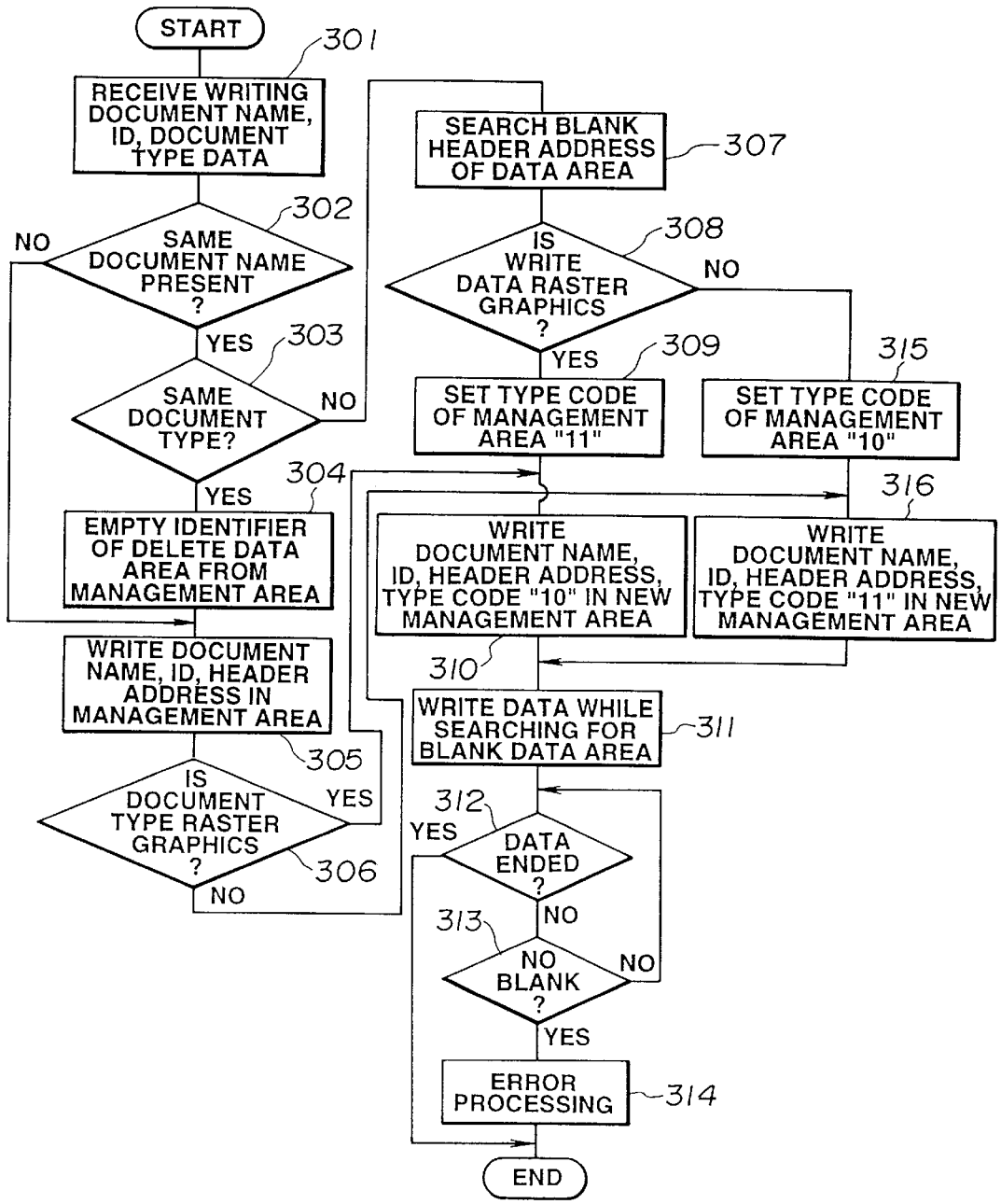
FIG. 22 is a flowchart for explaining the operation of the portable facsimile equipment of the embodiment of the present invention.

Explanation will next be directed to the data writing operation of the file management of the above portable facsimile equipment by referring to FIG. 22.

When the control module 11 receives (step 301) the writing document name data Wn, identification code Id and type code Co through operation of the keyboard 40 of the operating module 10 of FIG. 1, the control module judges whether the same document name data Wn is already recorded on in the disk 17 of the memory module 7 (step 302). In the presence of the same document name data Wn, the control module judges whether or not the type code Co is the same (step 303). When the type code Co is the same, the control module deletes the same document name data Wn from the corresponding management area e of the disk 17 of the memory module 7 and sets the identifier of the corresponding data area d to be blank or "00" (step 304). In the absence of the same document name data Wn, the control module sets the identifier id of the corresponding data area d to be blank ("00"), and then writes the received document name data Wn, identification code Id and header address data Ad in the corresponding management area e (step 305). In the memory module 7, data stored on the disk 17 is read at the read circuit 23 on the basis of a control signal supplied through the input/output circuit 25, subjected at the encoding/decoding circuit 21 to a decoding operation, and then output from the input/output circuit 25.

When the control module determines in the step 303 that the type code Co is not the same, searches the blank header address data Ad of the corresponding data area d (step 307), and then judges whether or not the writing data is of the raster graphics type (step 308). When the data is of the raster graphics type, the control module sets the type code of the corresponding management area e at "11" (step 309), writes in the new management area e the document name data Wn, identification code Id, header address data Ad and type code "10" (step 310), writes data while searching the blank data area d (step 311), judges the presence or absence of data therein (step 312), and terminates its operation in the absence of data.

In the memory module 7, when data supplied through the input/output circuit 25 is determined to be of the raster graphics type obtained from the reception or read in from the scanner module 8 on the basis of the control signal supplied through the input/output circuit 25, the data is subjected at the encoding/decoding circuit 21 to an encoding operation, and then written at the RAM 24 by the write circuit 22.

When the data is of the character type created by the document module 9, the data is written in the RAM 24 as it is, subjected, e.g., at the codec 20 to an encoding operation, and then recorded as encoded data on the disk 17 while the disk controller 19 drives the disk driving mechanism 18.

When determining in the step 308 that the data is not of the raster graphics type, the control module sets the type code of the management area e at "10" (step 315), and writes in the new management area e the document name data Wn, identification code Id, header address data Ad and type code "11" (step 316). When determining in the step 312 that the data is not terminated yet, the control module judges the presence or absence of a blank area (step 313), controls, e.g., the display module 13 to perform such error processing as displaying an error message on the display screen of the LCD display 84 (step 314), after which the control module terminates its operation.

Figure 23:
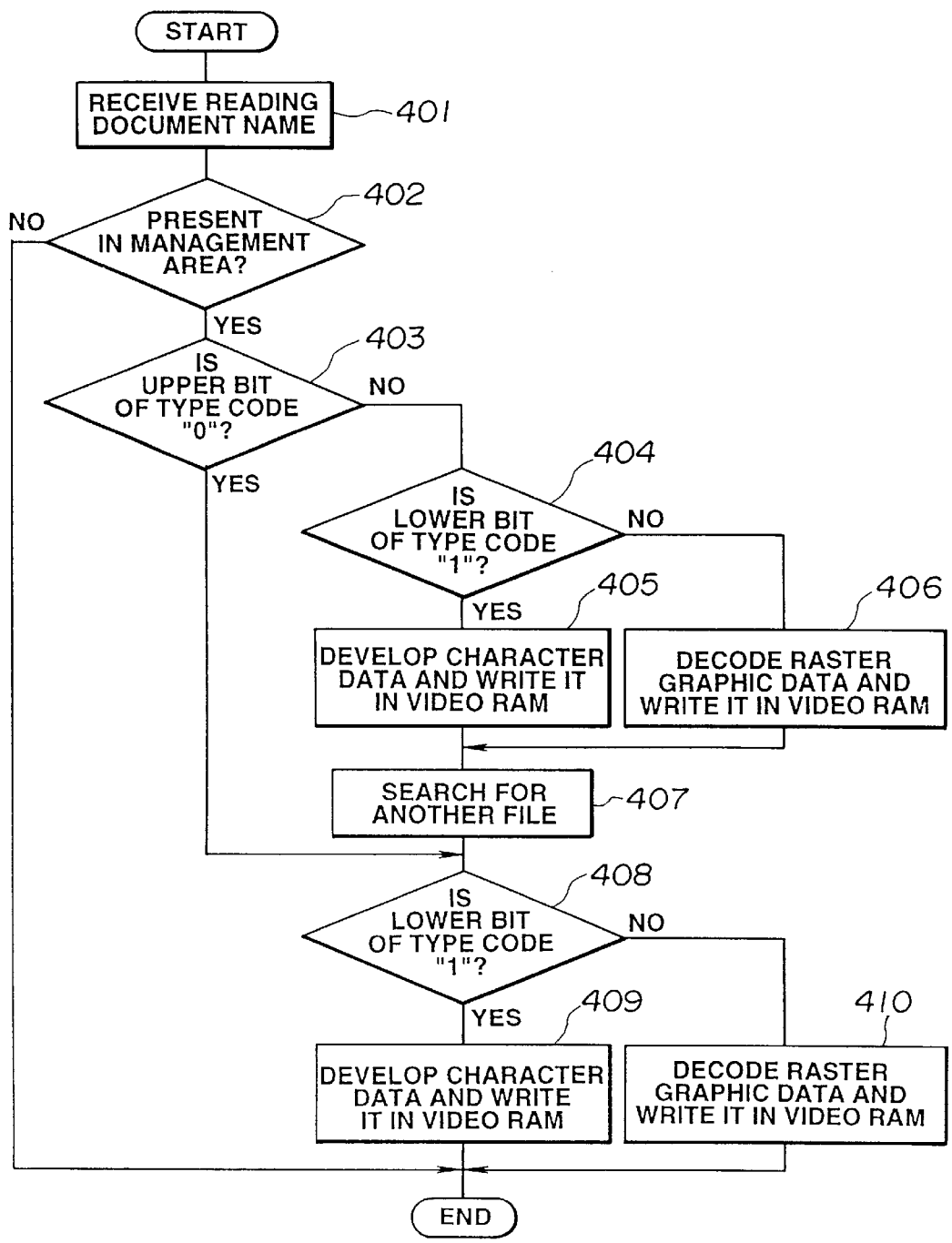
FIG. 23 is a flowchart for explaining the operation of the portable facsimile equipment of the embodiment of the present invention.

Turning next to FIG. 23, the data reading operation of the file management of the portable facsimile equipment will be explained.

When a document name is input through the keyboard 40 of the operating module 10 of FIG. 1, the control module receives the read document name data Wn through the data bus 5 (step 401), judges the presence or absence of the received document name data Wn in the management area e of the disk 17 of the memory module 7 (step 402). In the presence of the document name data Wn, the control module judges whether or not the upper bit of the type code is "0" (step 403). When the upper bit of the type code Co is "0", the control module judges whether or not the lower bit of the type code Co is "1" (step 408). When the lower bit of the type code Co is "1", the development circuit 26 of the memory module 7 develops the character data created, e.g., by the document module 9, the developed data is written in the video RAM 85 of the display module 13 (step 409). When the control module determines in the step 408 that the type code is not "1", the raster graphics data is subjected at the encoding/decoding circuit 21 to a decoding operation and then written in the video RAM 85 of the display module 13 (step 410).

When determining in the step 403 that the upper bit of the type code Co is not "0", the control module judges whether or not the lower bit of the type code is "1" (step 404). When the lower bit of the type code is "1", the character data is developed and written in the video RAM 85 of the display module 13 (step 405). When the lower bit of the type code is not "1", the raster graphics data is subjected at the encoding/decoding circuit 21 to a decoding operation and written in the video RAM 85 of the display module 13 (step 406).

Figure 24:
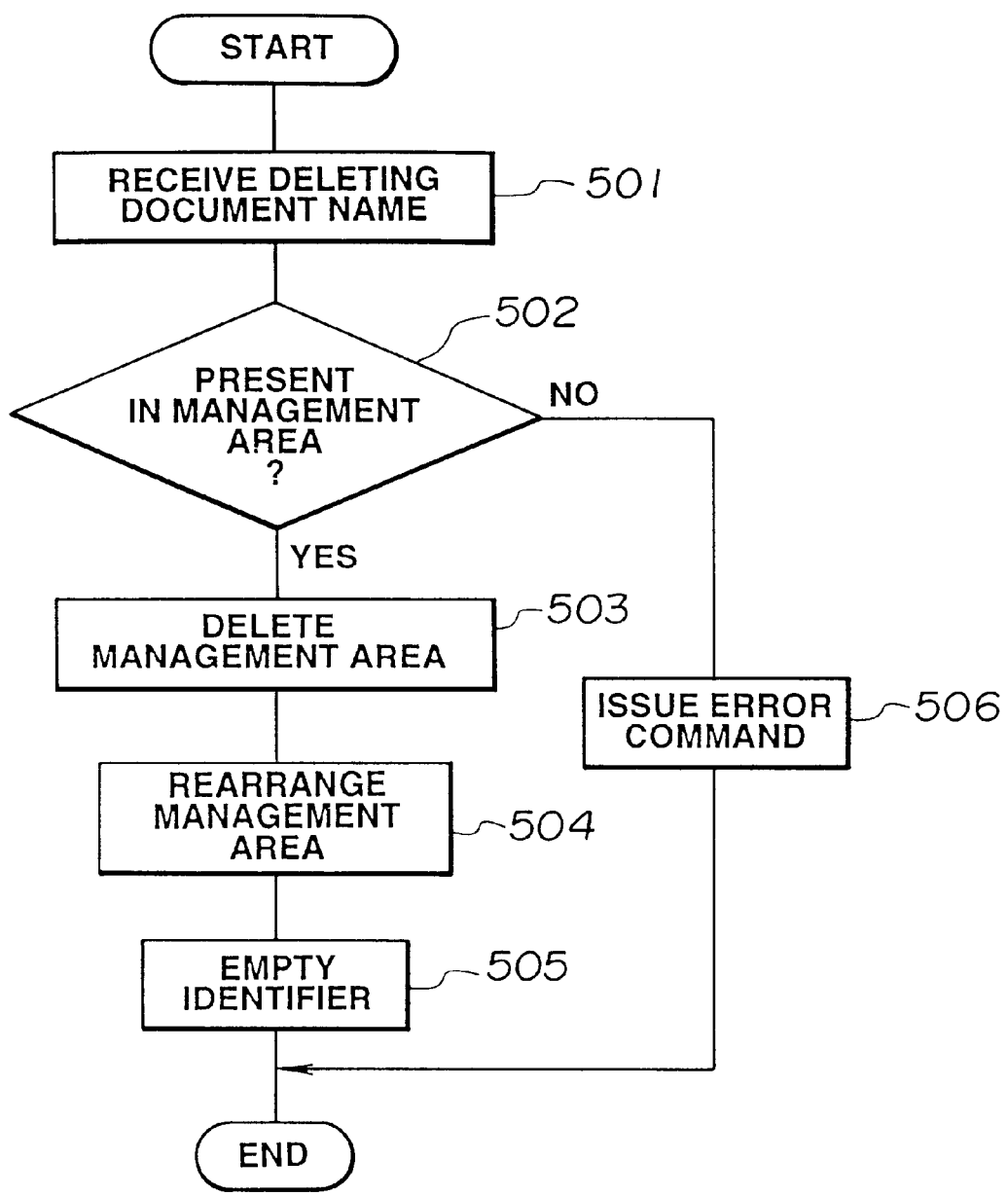
FIG. 24 is a flowchart for explaining the operation of the portable facsimile equipment of the embodiment of the present invention.

Explanation will then be made as to the file erasing operation of the file management of the portable facsimile equipment 1 by referring to FIG. 24.

When an erasing document name is input through the keyboard 40 of the operating module 10 of FIG. 1, the control module receives the input erasing document name data Wn (step 501), and judges the presence or absence of the received document name data Wn in the management area e of the disk 17 of the memory module 7 (step 502). In the presence of the same document name data Wn, the control module erases the document name data Wn present in the management area e (step 503), rearranges the management area e (step 504), and sets the identifier Id to be blank or "00" (step 505).

When determining in the step 502 that the same document name data Wn is absent in the management area e, the control module generates a command to cause the display module 13 to display such an error message as "document name is missing" on the display screen of the LCD display 84.

The document reading operation of the portable facsimile equipment will be explained by referring to FIGS. 25 and 26.

For example, when an original document is inserted into the document insert slot 103 shown in FIG. 13, the control module judges whether or not a read switch (not shown) was operated (step 601). When judging that the switch was operated, the control module 11 supplies a message M1 previously stored in the ROM 48 of the control module 11 of FIG. 1 to the display module 13. In the document module 13, the received message M1 is subjected at the input/output circuit 80 to an input operation, subjected at the displaying pixel density conversion circuit 81 to a conversion to display data, subjected at the write circuit 86 to a writing operation of the message M1 in the video RAM 85, and the message M1 written in the video RAM 85 is supplied to the LCD display 84 through the LCD driver 83 to display thereon as an image (step 602).

Assume now that the message M1 is expressed, e.g., as "Display necessary? N, Y." Then the control module judges whether or not the user depressed a 'Y' key of the keyboard 40 in the operating module 10 of FIG. 1 (step 603). When judging that the Y key was depressed, the control module erases the message M1 written in the video RAM 85, whereby the message M1 being displayed on the LCD display 84 disappears (step 604).

Next, as in the case of the message M1, a message M2 is supplied to the display module 13 to be displayed on the display screen of the LCD display 84 (step 605). Assume now that the message M2 is expressed, for example, as "Turn the hand roller. After turning, again push the read switch." The control module next judges the presence or absence of an output of the rotary encoder 31 of the scanner module 8 of FIG. 1 (step 606). In the presence of the output of the rotary encoder 31, the control module transfers the read data (line data) to the memory module 7 and document module 13 to be stored therein respectively (step 607).

In the memory module 7, the read data (raster graphics data) is subjected at the input/output circuit 25 to an inputting operation, subjected to an encoding operation and then subjected at the write circuit 22 to a writing operation in the RAM 24. In the document module 13, meanwhile, the input data is subjected at the displaying pixel density conversion circuit 81 to a conversion to display data and subjected at the write circuit 86 to a writing operation in the video RAM 85, and then the data written in the video RAM 85 is supplied to the LCD display 84 through the LCD driver 83 to be displayed as an image on the display screen thereof (step 608).

The control module next judges whether or not the read switch (not shown) was depressed (step 609). Until the control module determines that the read switch was depressed, shift from the step 606 to the step 608 is continued. When determining in the step 606 that the output of the rotary encoder 31 is absent, the control module judges whether or not a predetermined time T2 elapsed (step 610). Until the predetermined time T2 elapses, shift to the step 606 is continued.

Meanwhile, when determining in the step 603 that the 'Y' key was not depressed, the control module judges whether or not the 'N' key on the keyboard 40 of the operating module 10 of FIG. 1 was depressed (step 611). When determining the depressed 'N' key, the control module erases the message M1 being written in the video RAM 85 of the document module 13 (step 612), which results in the message M1 being displayed on the LCD display 84 disappearing.

And the control module writes the message M2 in the video RAM 85 to display the message M2 on the LCD display 84 (step 613). The control module next judges the presence or absence of the output of the rotary encoder 31 as in the step 606 (step 615). In the presence of the output of the rotary encoder 31, the control module transfers the line data to the document module 13 and memory module 7 to be stored therein as in the step 607 (step 616), and judges whether or not the read switch (not shown) was depressed (step 618). When determining that the read switch was depressed, the control module erases the message M2 written in the video RAM 85 to erase the message M2 being displayed on the LCD display 84 (step 619).

When determining in the step 611 that the 'N' key was not depressed, the control module judges whether or not a predetermined time T1 elapsed (step 614). Until the predetermined time T1 elapses, shift to the step 603 is continued.

When determining in the step 615 that there is an absence of the output of the rotary encoder 31, the control module judges whether or not the predetermined time T2 elapsed (step 617). Until the predetermined time T2 elapses, shift to the step 615 is continued.

Figure 26:
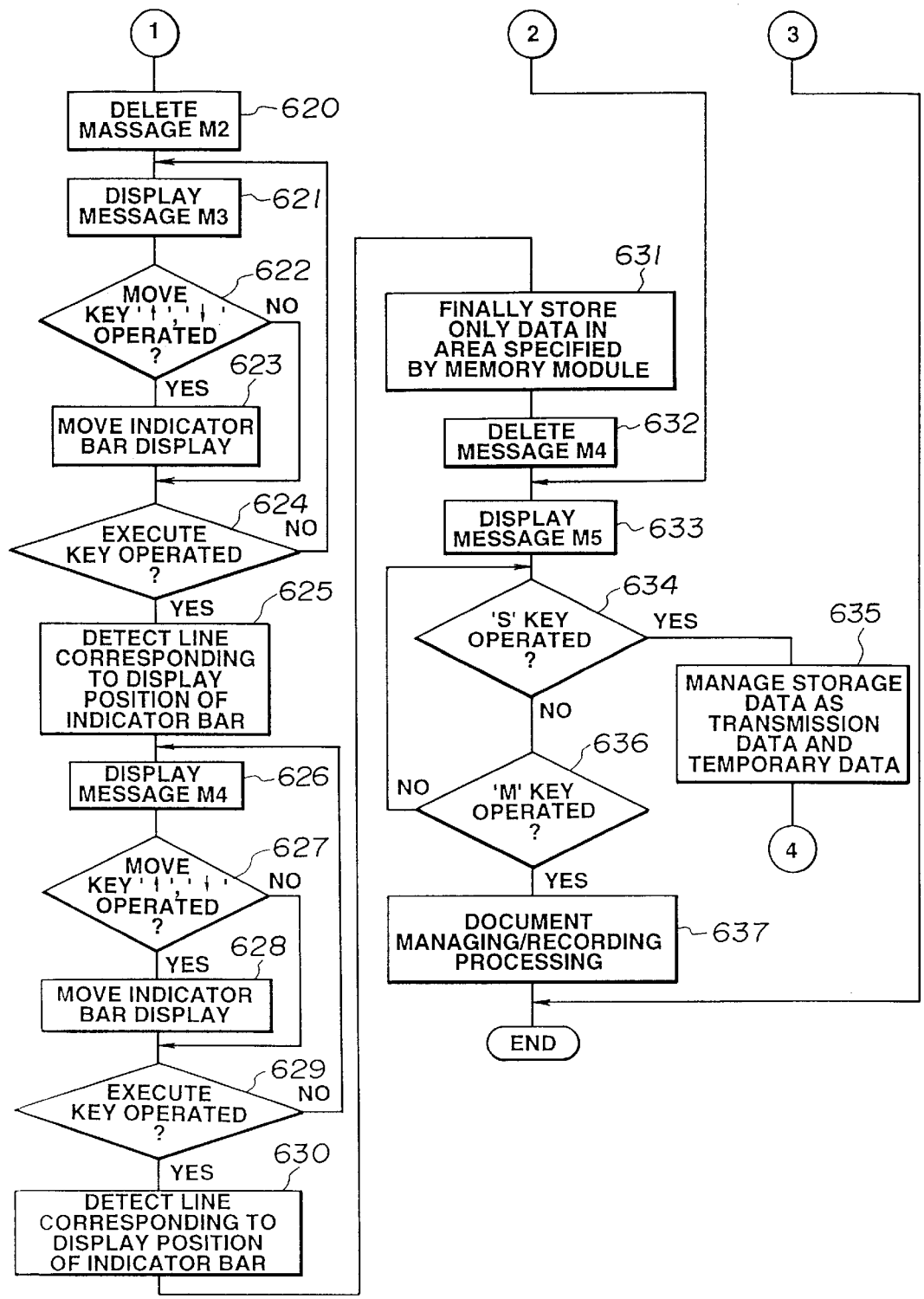
FIG. 26 is a flowchart for explaining the operation of the portable facsimile equipment of the embodiment of the present invention.

When determining in the step 609 that the read switch was depressed, the control module shifts to the step 620 in FIG. 26, erases the message M2 written in the video RAM 85 to erase the message M2 being displayed on the LCD display 84, and as in the display of the message M2, displays a message M3 on the LCD display 84 (step 621).

Assume now that the message M3 is expressed as, for example, "First specify its saving area. After specifying, push the EXECUTE KEY."

Next, the control module judges whether or not such a MOVE key as a '∘' Key or A '∘' key was operated (step 622). When determining that the MOVE key was operated, the control module controls the document module 13 to move a displayed indicator bar (step 623). In the document module 13, the indicator bar data is written by the write circuit 86 in the video RAM 85, and the indicator bar data written in the video RAM 85 is supplied to the LCD display 84 through the LCD driver 83 to be scrollingly displayed as an image thereon.

Next, the control module judges whether or not the EXECUTE key was depressed (step 624). Determination of the depressed EXECUTE key causes the control module to detect the corresponding line at the displayed position of the indicator bar (step 625) and then to display a message M4 on the screen of the LCD display 84 as in the messages M1 to M3 (step 626).

Assume now that the message M4 is expressed, for example, as "First specify the saving area. After specifying, depress the EXECUTE key."

Next, the control module judges whether or not such a MOVE key as a '∘' key or a '∘' key was operated (step 627). When determining that the MOVE key was operated, the control module controls the document module 13 to move the displayed indicator bar as in the step 623 (step 628).

Next, the control module judges whether or not the EXECUTE key was depressed (step 629). Determination of the depressed EXECUTE key causes the control module to detect the corresponding line at the displayed position of the indicator bar (step 630), to store only part of the read data in the memory module 7 corresponding to the specified area in the RAM 24 of the memory module 7 (step 631), and to erase the message M4 written in the video RAM 85 of the document module 13 to thereby erase the message M4 being displayed on the LCD display 84 (step 632). After this, the control module displays a message M5 on the screen of the LCD display 84 as in the messages M1 to M4 (step 633).

Assume now that the message M5 is expressed, for example, as "Want to transmit or save? Depress the 'S' key for transmission and the 'M' key for saving."

The control module next judges whether or not the 'S' key on the keyboard 40 in the operating module 10 was depressed (step 634). When judging that the 'S' key was depressed, the control module manages the data stored in the RAM 24 of the memory module 7 as transmitting and temporary data (step 635), and then shifts its operation to the transmitting operation of FIG. 27.

Meanwhile, when judging in the step 634 that the 'S' key was not depressed, the control module judges whether or not the 'M' key was depressed (step 636). Determination of the depressed 'M' key causes the control module to perform its document managing/registering operation, e.g., encoding operation of the data by the codec 20, to record the encoded data on the disk 17 while the disk controller 19 drives the disk driving mechanism 18, to perform writing operation of various sorts of management data in the management area e of the RAM 24 (step 637), and finally to terminate its operation.

When determining in the step 622 that the MOVE key was not depressed, the control module shifts to the step 624 to judge whether or not the EXECUTE key was depressed. When determining in the step 624 that the EXECUTE key was not depressed, the control module shifts again to the step 621. Similarly, when determining in the step 627 that the MOVE key was not depressed, the control module shifts to the step 629 to judge whether or not the EXECUTE key was depressed. When determining in the step 629 that the EXECUTE key was not depressed, the control module shifts again to the step 626.

Figure 25:
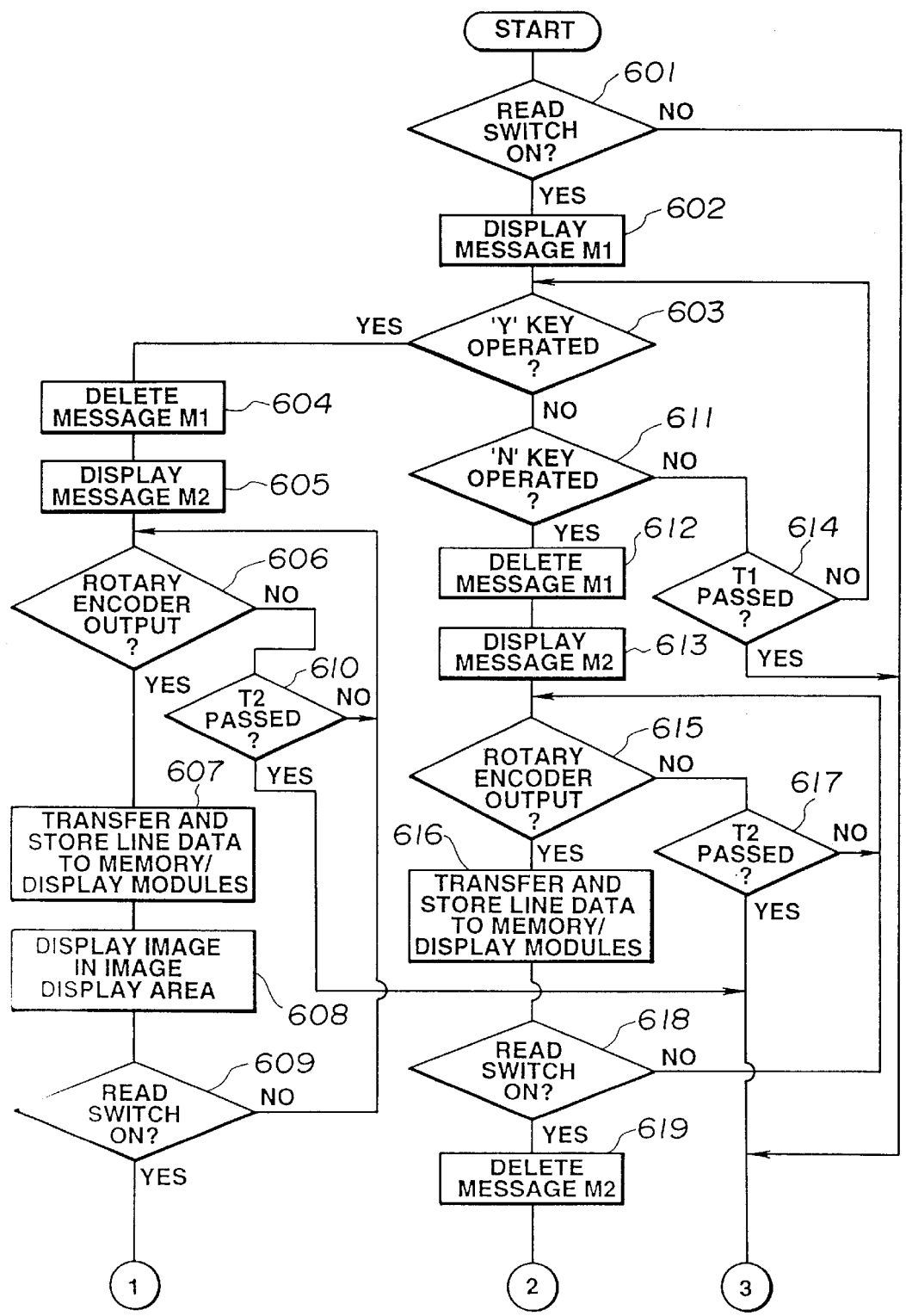
FIG. 25 is a flowchart for explaining the operation of the portable facsimile equipment of the embodiment of the present invention.

After erasing the message M2 in the step 619 in FIG. 25, the control module shifts to the step 633 in FIG. 26. When determining in the step 601 of FIG. 25 that the read switch was not depressed and when determining in the step 617 of FIG. 25 that the predetermined time T2 elapsed, the control module terminates its operation.

Figure 27:
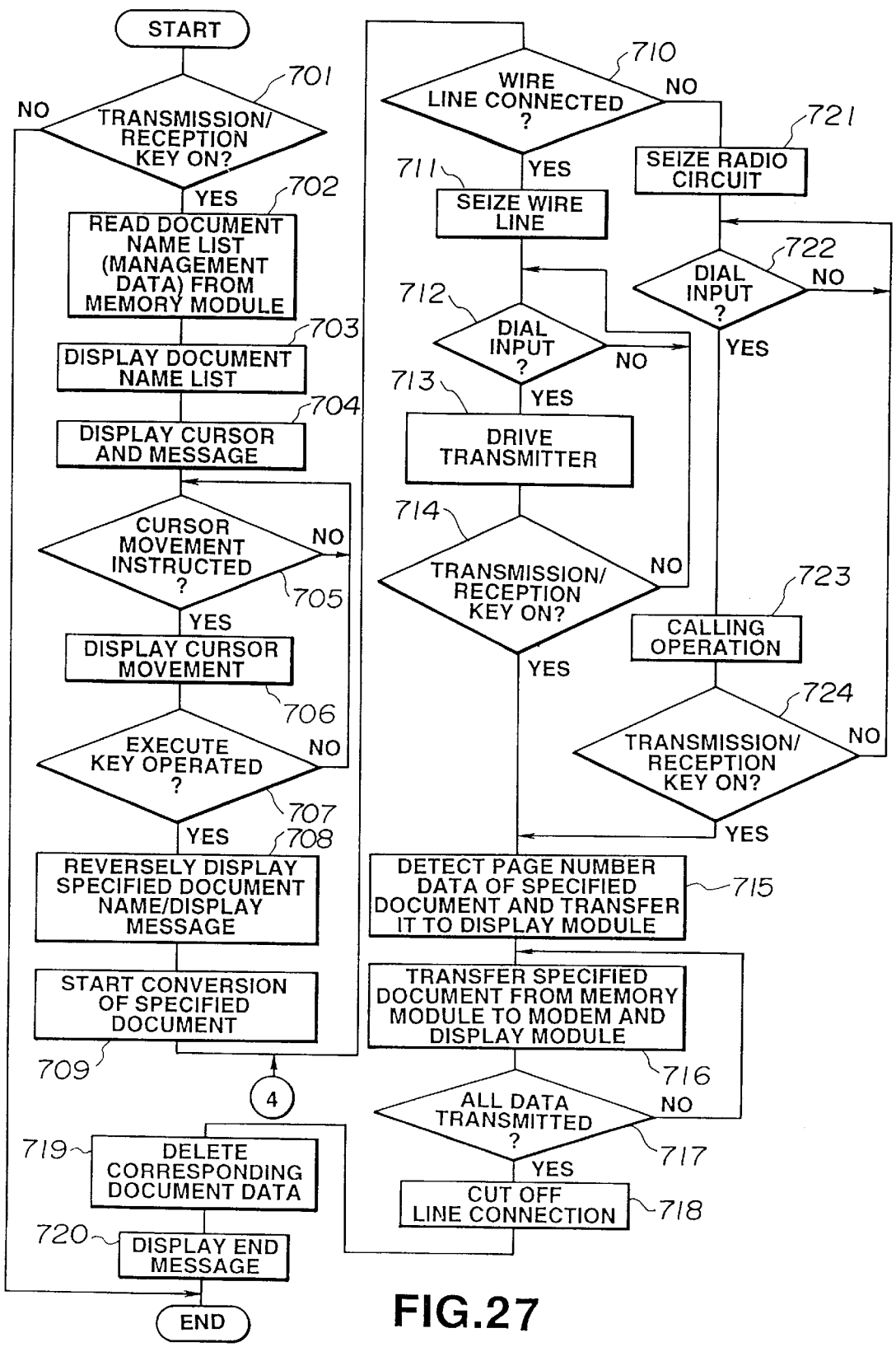
FIG. 27 is a flowchart for explaining the operation of the portable facsimile equipment of the embodiment of the present invention.

Next, explanation will be made as to the data transmitting operation of the portable facsimile equipment by referring to FIG. 27.

First, the control module judges whether or not the transmission/reception key 41 of the operating module 10 of FIG. 1 was depressed (step 701). Determination of the depressed transmission/reception key 41 causes a document name list table (management data) recorded on the disk 17 of the memory module 7 to be read out (step 702). In the memory module 7, the management data previously stored on the disk 17 is read out under control of the disk controller 19, decoded into decoded data and then output from the input/output circuit 25.

Next, the management data read out from the memory module 7 is supplied to the document module 13 to be written in the video RAM 85 of the document module 13, and the written management data is supplied to the LCD display 84 through the LCD driver 83 to be displayed on the display screen thereof as an image (step 703).

In the document module 13, the management data received from the input/output circuit 80 is subjected at the displaying pixel density conversion circuit 81 to a converting operation and subjected at the write circuit 86 to a writing operation of the converted data in the video RAM 85, and the written data is supplied through the LCD driver 83 to the LCD display 84 to be displayed on the display screen thereof as an image.

Similarly to the above, next, the control module writes a cursor and message data in the video RAM 85 of the document module 13, displays the cursor and message on the LCD display 84 (step 704), and judges the presence or absence of a cursor movement instruction on the basis of the operation of the cursor key on the keyboard 40 of the operating module 10 (step 705). When determining the presence of the instruction, the control module changes the position of the cursor data to b e written in the video RAM 85 of the document module 13 according to the instruction, performs cursor movement display (step 706), and judges whether or not the EXECUTE key was depressed (step 707). When determining that the EXECUTE key was depressed, the control module displays a document name specified by the cursor on the LCD display 84 as highlighted, displays the message thereon (step 708), and performs converting operation over the specified document (step 709). When the control module determines in the step 707 that the EXECUTE key was not depressed, shift to the step 705 is continued until the control module determines that the EXECUTE key was depressed.

In the memory module 7, the document data stored in the disk 17 is read out therefrom with the disk driving mechanism 18 controlled by the disk controller 19, subjected at the codec 20 to a decoding operation, subjected at the encoding/decoding circuit 21 to a decoding operation, and then output from the input/output circuit 25.

Next, in the wired system of the communication module 12, it is judged whether or not the wired line was connected (step 710). When the connection of the wired line was confirmed, the wired line is seized (step 711), the presence or absence of a dial input, for example, the presence or absence of an input of a telephone number with use of numeric keys on the keyboard 40 of the operating module 10 is judged (step 712), the DTMF transmitter is driven (step 713), and it is judged whether or not the transmission/reception key 41 was depressed (step 714). And when it is determined that the transmission/reception key 41 was depressed, page number data of the specified document is read out from the RAM 24 of the memory module 7 and transferred to the document module 13 (step 715), the specified-document data is read out from the disk 17 of the memory module 7 and transferred to the communication module 12 and document module 13 respectively (step 716). When it is determined in the step 714 that the transmission/reception key 41 was not depressed, shift to the step 712 is continued until it is determined that the transmission/reception key 41 was depressed.

In the communication module 12, the document data received from the memory module 7 is subjected at the input/output circuit 64 to an input operation, subjected at the codec 65b of the transmission/reception circuit 65 to an encoding operation, and then supplied to the line through the modem 65a, line control circuit 60, relay 61 and connector 62.

Next, the control module judges whether or not transmission of all data was terminated (step 717). When determining that the transmission was terminated, the control module turns OFF the relay 61 to cut off the line (step 718), deletes the corresponding document data (file) from the disk 17 of the RAM 24 of the memory module 7 (step 719), writes an end message in the video RAM 85 of the document module 13, displays the end message on the screen of the LCD display 84 (step 720), and terminates its operation. In this connection, in place of displaying the end message, the document data being displayed may be normally displayed during the transmission and may be highlightedly displayed after the transmission to provide different display formats to the display data, and further the document data being displayed may be erased after a predetermined period of time.

When judging in the step 710 that the wired line was not connected, the control module controls the radio system of the communication module 12 to seize a spatial radio circuit link (step 721), and judges the presence or absence of a dial input as in the above (step 722). In the presence of the dial input, the control module performs calling operation (step 723), and judges whether or not the transmission/reception key 41 was depressed (step 724). When it is determined that the transmission/reception key 41 was depressed, the control module shifts to the step 715 and shift to the step 722 is continued until it is judged that the transmission/reception key 41 was depressed.

That is, the radio system of the communication module 12 is controlled so that a signal from the bell source 74 is supplied through the speech circuit 70 and amplification circuit 59 to the transmitter 57 where the calling signal is modulated with a modulation signal received from the synthesizer 54, and calling to the destination party is carried out through the duplexer 56 and antenna 77. After the communication module is connected to the party, when the transmission/reception key 41 is depressed, the encoded document data is supplied through the amplification circuit 59 to the transmitter 57, subjected at the transmitter 57 to a modulating operation with the modulation signal received from the synthesizer 54, sent to the duplexer 56 and antenna 77, and then transmitted from the antenna 77 to the party.

In a signal reception mode, in order to inform the user of the fact that the reception of a signal was detected, the LED 45 is made to emit light continuously or intermittently (or such a message as "the reception of a signal was detected." is displayed on the LCD display 84), receive data received from the antenna 77 is sent through the duplexer 56 to the receive circuit 55, and subjected at the receive circuit 55 to a demodulating operation with a demodulation signal received from the synthesizer 54. The demodulated receive data is supplied through the modem 65a of the transmission/reception circuit 65 to the codec 65b, subjected at the codec 65b to a decoding operation, and supplied through the input/output circuit 64 to the document module 13 to be displayed on the screen of the LCD display 84 or to be supplied to the memory module 7. In the memory module 7, the decoded receive data is assigned to the aforementioned management area as document data, and written in the RAM 24 or disk 17 together with the document name data Wn, identification code Id, type code Co, header address data Ad, page data Pa, reception time data, etc. Further, the portable facsimile equipment receives an incoming call during preparation of document data with use of the document module 13, the control module 11 displays the presence of the incoming call on the LCD display 84, and controls not to accept any input from the document module 13, from the keyboard 40 on document preparation or from the transmission/reception key 41, for example, instruction for storing the document data in the RAM 24 or disk 17. Further, when the LCD board 3 is closed with the power switch being turned ON, the control module 11 detects the closed state of the board through the switch 124, and controls the communication module 12 to put it in its intermittent reception mode. When detecting the presence of a signal received in the communication module, the control module 11 controls the power supply 27 to cause the power supply to supply power to the communication module 12 and document module 13.

In this way, since the present embodiment is arranged so that document data stored on the disk 17 is read out and when it is desired to transmit the document data to the destination party as a facsimile signal, information to be transmitted is displayed on the LCD display 84 in synchronism with transmission of the document data, the information being transmitted can be confirmed and thus the handleability of the portable facsimile equipment can be improved.

Further, since the control module 11 provides different display formats to the information to be displayed on the LCD display 84 between during-transmission and after-transmission, the portable facsimile equipment can clearly inform the user of during transmission or after transmission.

The control module 11 causes the information to be displayed on the LCD display 84 to be highlighted during or after transmission, the display format of the displayed information during transmission can be made different from that of the displayed information after the transmission, the portable facsimile equipment can positively inform the user of during or after transmission.

After the transmission of the information displayed on the LCD display 84 is completed, the control module 11 erases the old information before the display of information to next be transmitted is started, whereby the portable facsimile equipment can clearly inform the user of the start of the transmission of the next information.

In addition, the control module 11 causes the display format of information to be displayed on the LCD display 84 during transmission to be made different from that after transmission on a 6mm display unit basis, whereby the display format can be easily changed at high speed and the portable facsimile equipment can quickly and reliably inform the user of during transmission and after transmission.

Since instruction for transmission causes information stored in the RAM 24 or disk 17 to be read out, the handleability of the portable facsimile equipment can be improved.

Furthermore, instruction for stoppage of transmission causes the control module 11 to controllably shift the portable facsimile equipment to its transmission end state. Thus, when the user want to stop the transmission, he can quickly stop the transmission and thus its handleability can be improved.

Also after passage of a predetermined time from the shift of the portable facsimile equipment to the transmission end state, the information being displayed on the LCD display 84 is erased. Thus, the user can again confirm the transmitted information and the handleability can be improved.

In the present invention, when a plurality of transmissions are specified for document data corresponding to the management data recorded on the disk 17, the specified document data are continuously read out for each management data and transmitted to the destination party, page data of the corresponding document data of all the management data to be transmitted is added thereto, the current transmission page is counted, and the page data is displayed on the LCD display 84 in synchronism with the transmission of the transmission page data and information. As a result, the user can see the transmission state of the information and the handleability of the portable facsimile equipment can be improved.

Further, since the display screen of the LCD display 84 is made up of an area for display of the information to be transmitted and a control information display area for displaying thereon at least the page data, the portable facsimile equipment can reliably inform the user of the transmission state.

In the present embodiment, document data recorded on the disk 17 is read out, and when an error is detected in the transmission state during transmission of the document data to the destination party, the document data is again read out from the disk 17 or RAM 24 and again transmitted, and during the re-transmission, an error message or the like is attached to the document data read out from the disk 17. Thus, the portable facsimile equipment can reliably transmit the information to the destination party and also can inform the destination party of the occurrence of the error during the transmission.

Since information to be read out from the RAM 24 or disk 17 during the detection of the error is information of a page unit containing the error occurrence information, the re-transmitting operation to the destination party can be simplified. And when re-transmission to the destination party is carried out, the destination party can receive the re-transmitted information on a page basis.

In the present embodiment, furthermore, since document data is recorded on the disk 17, and when it is desired to transmit the data to the destination party on a predetermined-page unit basis as a facsimile signal and when the data of the last page of the document data to be transmitted corresponds to less than one page, white line data is added to the last page so that the data of the last page corresponds to one page, whereby the user can transmit the data to the destination party on a page unit basis.

When the data of the last page of information to be transmitted corresponds to less than one page, the control module 11 causes white line information to be added to the last page information so that the data of the last page to be transmitted corresponds to one page, whereby transmission of the data and reception thereof at the destination party can be carried out on a page unit basis and the information transmitted from this sender facsimile equipment can be easily arranged at the destination party side.

When the data of the last page of read information to be transmitted corresponds to less than one page, the control module 11 causes white line information to be added to the last page information so that the data of the last page to be transmitted corresponds to one page, whereby processing at the transmission side can be simplified, the destination party can receive the information on a page unit basis, and thus the information transmitted from the sender facsimile equipment can be easily arranged at the destination party side.

In the present embodiment, when the switch 124 and the control module 11 detect the open state of the LCD display 84, the power supply 27 supplies power to the communication module 12, document module 9 and document module 13; and when the power switch is turned ON and when the switch 124 and control module 11 detect the closed state of the power switch, the power supply 27 controllably inhibits supply of power to the communication module 11, document module 9 and display module 13, whereby the power consumption of the portable facsimile equipment can be reduced.

When the power switch is turned ON and the control module 11 detects the closed state of the LCD board 3 by the switch 124, the control module 11 causes the communication module 12 to be put in its intermittent reception state so that, when the communication module 12 detects an incoming call, power is continuously supplied to the communication module 12 and document module 9, whereby the power consumption of the portable facsimile equipment can be remarkably reduced.

In the present invention, further, when the power switch is turned ON and when the switch 124 and control module 11 detect the open state of the document module 9, the power supply 27 supplies power to the communication module 12, document module 9 and display module 13; when the power switch is turned ON and the switch 124 and control module 11 detect the closed state of the LCD board 3, the power supply inhibits its power supply to the communication module 12, document module 9 and display module 13; and when the power switch is turned ON and the switch and control module 11 detect the closed state of the LCD board 3, the operated data of the transmission/reception key 41 is made invalid, whereby the power consumption of the portable facsimile equipment can be reduced and erroneous operation and erroneous transmission thereof can be prevented.

Further, when the communication module 12 detects an incoming call, the control module 11 causes the operated data of the transmission/reception key 41 to be made valid, whereby the portable facsimile equipment can reliably receive the information.

In the present embodiment, information read out by the scanner 104 is recorded on the disk 17 sequentially from its minimum address area, and management data is recorded in the disk 17 sequentially from its maximum address area, thus, the recording area can be effectively used.

Since such magnetic recording medium as magneto-optical disk, hard disk and floppy disk is used as the disk 17, the handleability of the portable facsimile equipment can be improved, document data such as key-in data, read data and transmission data can be managed in the form of files.

Further, since the data of the management area e is made up of the document name data Wn indicative of the title or name of information to be recorded, the type code Co indicative of the format of the format, the identification number Id, the header address data Ad indicative of the recording position, the page number data Pa when a predetermined unit is set to be one page; the management of the document data can be finely carried out.

In addition, since the upper bit of the type code Co is used as the data indicative of the presence or absence of other document data and the lower bit thereof is used as the data indicative of whether the document data is of the character or raster type, the control module 11 can detect the sort of the document data, whereby the processing of storing the data in the RAM 24 or disk 17 can be selected.

In accordance with the present embodiment, in this way, there can be provided a portable facsimile equipment which has the same functions as a fixed facsimile equipment and also which allows its portable use.

What is claimed is:

1. A portable facsimile equipment comprising:

document management means for storing and managing a plurality of documents;

document preparation processing means for preparing a document;

display means;

first display control means for causing the display means to display a list of document names corresponding to the plurality of documents stored in the document management means;

selecting means for selecting a document name corresponding to a document to be transmitted from among the plurality of document names displayed on the display means; transmitting means for transmitting as a facsimile signal the document to be transmitted to a destination party;

transmission control means for reading out from the document management means a document corresponding to the document name selected by the selecting means and transmitting the read document to the transmitting means and the display means;

receiving means for receiving and demodulating a facsimile signal from a communicating party; and second display control means for causing the display means to display the document transmitted by the transmission control means in synchronism with a transmitting operation by the transmitting means, wherein the first display control means causes the display means to display a document name being transmitted by the transmitting means and another document name in different display formats;

the document management means subjects the document data to be stored to a first encoding scheme when said document data is character data, and subjects the document data to be stored to a second encoding scheme when said document data is raster data; and the document management means halts the operation of the document preparation processing means when a signal is being received from a communicating party.

2. A portable facsimile equipment as claimed in claim 1, wherein the first display control means causes the display means to reverse-display the document name being transmitted by the transmitting means.

3. A portable facsimile equipment comprising:

document management means for storing and managing a plurality of documents;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means, wherein the second display control means causes the display means to display a document whose transmission has been completed by the transmitting means and another document in different display formats.

4. A portable facsimile equipment as claimed in claim 3, wherein the second display control means causes the display means to display the document whose transmission has been completed by the transmitting means in different display formats on a predetermined information unit basis.

5. A portable facsimile equipment comprising:

document management means for storing and managing a plurality of documents;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means, wherein the document management means stores the document in a predetermined management unit and also stores page data of the document of the predetermined management unit, the transmission control means sequentially reads out a plurality of information of the predetermined management unit stored in the document management means and transmits the read-out information to the transmitting means and the display means; and second display control means comprises:

counter means for counting a current transmission page by adding page data of all of the documents of the management unit transmitted by the transmitting means, and page display control means for causing the display means to display the current transmission page counted by the counter means in synchronism with the transmission operation by the transmitting means.

6. A portable facsimile equipment as claimed in claim 5, wherein the display means includes:

a first display area for displaying the transmitted document, and a second display area for displaying at least the current transmission page.

7. A portable facsimile equipment comprising:

document management means for storing and managing a plurality of documents;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means, wherein the transmission control means further comprises:

error detecting means for detecting an error in a transmission state of the transmitting means, re-transmitting means, if the error in the transmitting means is detected by the error detecting means, for re-reading the document to be transmitted from the document management means and re-transmitting the re-read document to the transmitting means and the display means, and message attaching means for attaching a predetermined message to the document to be transmitted at the time of retransmission by the re-transmitting means.

8. A portable facsimile equipment as claimed in claim 7, wherein the re-transmitting means re-transmits a predetermined unit of information including the error detected by the error detecting means.

9. A portable facsimile equipment comprising:

document management means for storing and managing a plurality of documents;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means;

wherein the transmission control means comprises:

unit transmitting means for transmitting the document to be transmitted in a predetermined unit to the transmitting means and the display means, and dummy information attaching means, when the information to be transmitted from the unit transmitting means is less than the predetermined unit, for attaching dummy information so that the information to be transmitted from the unit transmitting means becomes the predetermined unit of information.

10. A portable facsimile equipment as claimed in claim 9, wherein the dummy attaching means, when information to be transmitted last from the transmission control means is less than the predetermined unit, attaches the dummy information so that the information to be transmitted last becomes the predetermined unit of information.

11. A portable facsimile equipment as claimed in claim 9, wherein the document stored in the document management means includes a document read in by a scanner, the dummy attaching means, when the information to be transmitted last is less than the predetermined unit, attaches the dummy information so that the information to be transmitted last becomes the predetermined unit of information, only if the document to be transmitted from the transmission control means is the document read by the scanner.

12. A portable facsimile equipment comprising:

document management means for storing and managing a plurality of documents;

document preparation processing means for preparing a document;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means;

receiving means for receiving and demodulating a facsimile signal from a communicating party; and second display control means for causing the display means to display the document transmitted by the transmission control means in synchronism with a transmitting operation by the transmitting means, wherein the document management means stores an image of a first resolution read by a scanner, the display means displays the image with a second resolution, and the transmission control means comprises resolution converting means for converting the image having the first resolution into an image having the second resolution, when transmitting the image having the first resolution to the display means;

the document management means subjects the document data to be stored to a first encoding scheme when said document data is character data and subjects the document data to be stored to a second encoding scheme when said document data is raster data; and the document management means halts the operation of the document preparation processing means when a signal is being received from a communicating party.

13. A portable facsimile equipment as claimed in claim 12, wherein the scanner has a resolution of n lines/mm, and the display means has a resolution of m lines/mm, where n>2 m.

14. A portable facsimile equipment as claimed in claim 12, wherein the transmission control means transmits to the transmitting means the image with the first resolution corresponding to a resolution of the image transmitted to the display means.

15. A portable facsimile equipment as claimed in claim 12, wherein the second display control means comprises scrolling means for scrolling the document displayed on the display means at a predetermined information unit when receiving an instruction for scrolling display.

16. A portable facsimile equipment comprising:

document management means for storing and managing a plurality of documents;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means, wherein the document management means stores an image of a first resolution read by a scanner, the display means displays the image with a second resolution, and the transmission control means comprises resolution converting means for converting the image having the first resolution into an image having the second resolution, when transmitting the image having the first resolution to the display means;

the scanner has a resolution of n lines/mm, the display means has a resolution of m lines/mm, where n>2 m; and the transmission control means transmits an image having the resolution of n lines/mm which is stored in the document management means by converting the image having the resolution of n lines/mm into an image having the resolution of m lines/mm.

17. A portable facsimile equipment comprising:

document management means for storing and managing a plurality of documents;

display means:

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means, wherein the document management means stores an image of a first resolution read by a scanner, the display means displays the image with a second resolution, and the transmission control means comprises resolution converting means for converting the image having the first resolution into an image having the second resolution, when transmitting the image having the first resolution to the display means;

the scanner has a resolution of n lines/mm, the display means has a resolution of m lines/mm, where n>2 m; and the transmission control means converts an image having the resolution of n lines/mm stored in the document management means into an image having the resolution of m lines/mm and displays on the display means the converted image on the basis of a predetermined unit of at least common multiple of the resolutions.

18. A portable facsimile equipment comprising:

document management means for storing and managing a plurality of documents;

display means;

first display control means for causing the display means to display a list of document names corresponding to the plurality of documents stored in the document management means;

means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means, wherein the document management means stores an image of a first resolution read by a scanner, the display means displays the image with a second resolution, and the transmission control means comprises resolution converting means for converting the image having the first resolution into an image having the second resolution, when transmitting the image having the first resolution to the display means;

the scanner reads the information of the document with the first resolution, the document management means manages and stores the image read by the scanner in a predetermined information unit, the display unit means displays the image with a predetermined display unit, and the second display control means comprises:

display storage means having a storage area of the predetermined information unit and a storage area of an integer multiple of the storage area of the predetermined display unit, for storing information to be displayed on the display means, and scrolling control means, when receiving an instruction for scrolling display, for causing the display means to scrollingly display the information in the predetermined unit.

19. A portable facsimile equipment comprising: document management means for storing and managing a plurality of documents;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means, wherein the document management means stores an image of a first resolution read by a scanner, the display means displays the image with a second resolution, and the transmission control means comprises resolution converting means for converting the image having the first resolution into an image having the second resolution, when transmitting the image having the first resolution to the display means;

the scanner reads the information of the document with the first resolution, the document management means manages and stores the image read by the scanner in a predetermined information unit, the display unit means displays the image with a predetermined display unit, and the second display control means comprises:

display storage means having a storage area of the predetermined information unit and a storage area of an integer multiple of the storage area of the predetermined display unit, for storing information to be displayed on the display means, wherein; and scrolling control means, when receiving an instruction for scrolling display, for causing the display means to scrollingly display the information in the predetermined unit; wherein the display storage means has the storage area of the predetermined display unit, a storage area of the predetermined information unit for storage of display information immediately before display, and a storage area of the predetermined information unit for storage of display information immediately after display.

20. A portable facsimile equipment comprising:

document management means for storing and managing a plurality of documents;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means; and electric field intensity detecting means for detecting an electric field intensity of the destination party, and electric field intensity display means for causing the display means to display on a control information display area of the display means the electric field intensity information of the destination party detected by the electric field intensity detecting means, wherein the transmitting means transmits the facsimile signal to the destination party through a radio link.

21. A portable facsimile equipment comprising:

document management means for storing and managing a plurality of documents;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means;

radio link connecting means for establishing a connection with a radio link;

wire line connecting means for selectively connecting a wire line; and wire line connection detecting means for detecting that the wire line has been connected by the wire line connecting means, and wherein the transmitting means transmits the facsimile signal using the wire line when the connection of the wire line is detected by the wire line connection detecting means, and transmits the facsimile signal using the radio link when the connection of the wire line is not detected, wherein the display means displays a type of line which is used for transmission of the facsimile signal by the transmitting means at the time of using the wire line.

22. A portable facsimile equipment comprising:

document management means for storing and managing a plurality of documents;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means;

radio link connecting means for establishing a connection with a radio link;

wire line connecting means for selectively connecting a wire line; and wire line connection detecting means for detecting that the wire line has been connected by the wire line connecting means, and wherein the transmitting means transmits the facsimile signal using the wire line when the connection of the wire line is detected by the wire line connection detecting means, and transmits the facsimile signal using the radio link when the connection of the wire line is not detected, wherein the wire line connection detecting means mechanically detects a connection of a modular jack of the wire line.

23. A portable facsimile equipment comprising:

document management means for storing and managing a plurality of documents;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means;

radio link connecting means for establishing a connection with a radio link;

wire line connecting means for selectively connecting a wire line; and wire line connection detecting means for detecting that the wire line has been connected by the wire line connecting means, and wherein the transmitting means transmits the facsimile signal using the wire line when the connection of the wire line is detected by the wire line connection detecting means, and transmits the facsimile signal using the radio link when the connection of the wire line is not detected, wherein the wire line connection detecting means detects a predetermined station power direct current transmitted from the wire line through the modular jack.

24. A portable facsimile equipment comprising:

document management means for storing and managing a plurality of documents;

display means;

first display control means for causing the display means to display a list of document names corresponding to the plurality of documents stored in the document management means;

selecting means for selecting a document name corresponding to a document to be transmitted from among the plurality of document names displayed on the display means;

transmitting means for transmitting as a facsimile signal the document to be transmitted to a destination party;

transmission control means for reading out from the document management means a document corresponding to the document name selected by the selecting means and transmitting the read document to the transmitting means and the display means; and second display control means for causing the display means to display the document transmitted by the transmission control means in synchronism with a transmitting operation by the transmitting means;

document preparation processing means for preparing a document; and receiving means for receiving and demodulating a facsimile signal from a communicating party, wherein the document management means comprises:

a first storage section for storing the document prepared by the document preparation processing means, and a second storage section for storing the document received and demodulated by the receiving means, and wherein the portable facsimile equipment further comprises reception document display control means, when detecting a reception request of the facsimile signal by the receiving means at the time the document preparation processing means is preparing the document, for causing the display means to display the received document stored in the second storage section.

* * * * *